(12) United States Patent
Agiwal et al.

(10) Patent No.: US 9,706,435 B2
(45) Date of Patent: Jul. 11, 2017

(54) METHOD AND SYSTEM FOR DYNAMICALLY CHANGING UPPER BOUND ON DATA PACKET SIZE IN WIRELESS COMMUNICATION NETWORKS

(75) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 14/129,432

(22) PCT Filed: Jul. 2, 2012

(86) PCT No.: PCT/KR2012/005250
§ 371 (c)(1),
(2), (4) Date: Dec. 26, 2013

(87) PCT Pub. No.: WO2013/005965
PCT Pub. Date: Jan. 10, 2013

(65) Prior Publication Data
US 2014/0146834 A1    May 29, 2014

(30) Foreign Application Priority Data

Jul. 1, 2011   (IN) .......................... 2263/CHE/2011
Jun. 29, 2012  (IN) .......................... 2263/DEL/2011

(51) Int. Cl.
*H04W 28/06* (2009.01)
*H04W 28/18* (2009.01)

(52) U.S. Cl.
CPC ............ *H04W 28/06* (2013.01); *H04W 28/18* (2013.01)

(58) Field of Classification Search
None
See application file for complete search history.

(56) References Cited

U.S. PATENT DOCUMENTS

| | | | |
|---|---|---|---|
| 8,457,057 B2* | 6/2013 | Maheshwari | ................ 370/329 |
| 2002/0015403 A1* | 2/2002 | McConnell | ............ H04L 12/14 370/352 |

(Continued)

OTHER PUBLICATIONS

Kumudu S. Munasinghe et al. An analytical evaluation of mobility management in integrated WLAN-UMTS networks, 2008 Elsevier.

*Primary Examiner* — Kevin C Harper
*Assistant Examiner* — Derrick V Rose
(74) *Attorney, Agent, or Firm* — Jefferson IP Law, LLP

(57) ABSTRACT

The present invention provides a method and system for dynamically changing upper bound on size of data packets. In one embodiment, a transmitting device determines a need to change existing negotiated maximum size for an active connection when size of data packets for an application is switched, a new application is mapped to the active connection or Maximum Transmission Unit (MTU) of broadband wireless network is changed. Then, the transmitting device sends a request message indicating a new negotiated maximum size for changing the existing negotiated maximum size to the receiving device. The receiving device sends a response message confirming change to the new negotiated maximum size to the transmitting device. Accordingly, the transmitting device and the receiving device uses the new negotiated maximum size for building data packets and decoding the received data packets respectively based on a predefined parameter (e.g., sequence number/action time) indicated in the request/response message.

24 Claims, 20 Drawing Sheets

(56) References Cited

U.S. PATENT DOCUMENTS

| | | | |
|---|---|---|---|
| 2004/0057412 A1* | 3/2004 | Curcio | H04W 28/18 370/341 |
| 2004/0218630 A1* | 11/2004 | An | H04L 47/10 370/470 |
| 2008/0186946 A1* | 8/2008 | Marinier | H04L 49/90 370/349 |
| 2008/0310448 A1* | 12/2008 | Hanov et al. | 370/470 |
| 2011/0051664 A1* | 3/2011 | Kim et al. | 370/328 |
| 2014/0050193 A1* | 2/2014 | Cho | B60W 50/085 370/329 |

\* cited by examiner

METHOD AND SYSTEM FOR DYNAMICALLY CHANGING UPPER BOUND ON DATA PACKET SIZE IN WIRELESS COMMUNICATION NETWORKS

TECHNICAL FIELD

The present invention generally relates to the field of wireless communications, and more particularly relates to dynamically changing upper bound on data packet size in wireless communication networks.

BACKGROUND ART

Broadband wireless networks based on various standards (e.g., Institute of Electronic and Electric Engineers (IEEE) 802.16 based WiMAX standard and its evolution to IEEE 802.16m provides various types of services such as voice, packet data and so on. In order to provide these kinds of services, control information and data packets needs to be exchanged between a transmitting device and a receiving device. In downlink scenario, the transmitting device may include a base station and the receiving device may include a mobile station. In uplink scenario, the transmitting device may include a mobile station and the receiving device may include a base station.

Typically, service data is generated by various applications running at the transmitting device for providing various types of services. The service data is then exchanged between the transmitting device and the receiving device upon establishing a connection. Generally, the connection is identified by a connection identifier.

Multiple connections may exist between the transmitting device and the receiving device to carry service user data belonging to multiple applications running at the transmitting device and the receiving device. On the contrary, a single connection may also be used to carry the service user data belonging to multiple applications running at the transmitting device and the receiving device. Each connection carries variable size MAC Service Data Units (SDUs) received from various applications and contains service user data.

Typically, the transmitting device generates MAC PDUs from one or more MAC SDUs and transmits the MAC PDUs in physical burst to the receiving device over a wireless network. Each MAC PDU generally consists of a MAC header and a payload. In case fragmentation is enabled, payload of each MAC PDU contains a fragmented MAC SDU. In case fragmentation is not enabled, payload of each MAC PDU contains one or more unfragmented MAC SDUs, each unfragmented MAC SDU having size equal to a negotiated maximum size as depicted in FIG. 1. A negotiated maximum size is a maximum size of MAC SDU that a MAC layer can receive from an upper protocol for transmitting the MAC SDU on a MAC layer connection. The negotiated maximum size enables the receiving device to determine whether payload of received MAC PDU contains single or multiple MAC SDUs during unpacking of the MAC PDU.

The negotiated maximum size generally depends on size of application and its throughput requirements, Maximum Transmission Unit (MTU) of the broadband wireless network, whether security is applied by MAC layer on MAC layer connection, whether security algorithm is independently applied on each MAC SDU or each payload containing one or more MAC SDUs and/or other fixed information added to MAC SDUs for generating MAC PDU(s).

Typically, negotiated maximum size of a MAC SDU that the MAC layer can receive from upper protocol layers for transmission on the MAC layer connection is preset by a network entity (e.g., a base station) for all connections. However, the preset negotiated maximum size can be altered by the transmitting device independently for one or more connections when size of data packets for an application is switched, a new application is mapped to a connection, or MTU of the broadband wireless network is changed. However, the receiving device may not be in sync with the transmitting device during change in the preset negotiated maximum size. As a consequence, the receiving device continues decoding the received MAC PDUs using the previous negotiated maximum size, leading to failure to decode the MAC PDUs carrying unfragmented MAC SDUs with size equal to the new negotiated maximum size.

DISCLOSURE OF INVENTION

Solution to Problem

Aspects of the present invention are to address at least the above-mentioned problems and/or disadvantages and to provide at least the advantages described below.

In accordance with an aspect of the present invention, a method for changing negotiated maximum size of unfragmented Medium Access Control (MAC) Service Data Unit (SDU) transmitted in a MAC Protocol Data Unit (PDU) is provided. The method includes determining a need to change first negotiated maximum size of unfragmented MAC SDUs transmitted in MAC PDUs by a transmitting device; sending a request message for changing the first negotiated maximum size to a receiving device, wherein the request message comprises at least one of a second negotiated maximum size, connection identifier information and sequence number information; and receiving a response message confirming change from the first negotiated maximum size to the second negotiated maximum size from the receiving device.

In the method, the method further comprises disabling transmission of MAC PDUs containing one or more unfragmented MAC SDUs upon determining the need for change in the first negotiated maximum size.

In the method, the method further comprises disabling packing of multiple unfragmented MAC SDUs in a MAC PDU upon determining the need for change in the first negotiated maximum size.

In the method, the method further comprises determining a sequence number of the last MAC PDU transmitted to the receiving device prior to transmission of the request message.

In the method, the method further comprises forming one or more MAC PDUs upon receiving the response message, wherein each of the one or more MAC PDUs contains one or more unfragmented MAC SDUs built based on the second negotiated maximum size, and wherein the sequence number of the one or more MAC PDUs is greater than sequence number of last MAC PDU transmitted prior to transmission of the request message; and transmitting the one or more MAC PDUs which contains the one or more unfragmented MAC SDUs to the receiving device so that the one or more unfragmented MAC SDUs are decoded by the receiving device from each of the one or more MAC PDUs based on the second negotiated maximum size.

In the method, the method further comprises determining total number of MAC PDUs carrying one or more unfragmented MAC SDUs built based on the first negotiated maximum size to be transmitted to the receiving device prior to transmission of one or more MAC PDUs containing one or more unfragmented MAC SDUs whose size is less than or equal to the second negotiated maximum size; and transmitting the total number of MAC PDUs carrying the one or more unfragmented MAC SDUs to the receiving device.

In the method, the method further comprises forming one or more MAC PDUs upon transmission of the total number of MAC PDUs, wherein each of the one or more MAC PDUs contains one or more unfragmented MAC SDUs built based on the second negotiated maximum size, and wherein the sequence number of the one or more MAC PDUs is greater than the sequence number of the last MAC PDU transmitted prior to transmission of the one or more MAC PDUs; and transmitting the one or more MAC PDUs which contains the one or more unfragmented MAC SDUs to the receiving device so that the one or more unfragmented MAC SDU is decoded by the receiving device from each of the one or more MAC PDUs based on the second negotiated maximum size.

In accordance with an aspect of the present invention, a transmitting device comprises a transceiver; a processor; and memory coupled to the processor, wherein the memory includes a packet size negotiation module configured for: determining a need to change first negotiated maximum size of unfragmented Medium Access Control (MAC) Service Data Units (SDUs) transmitted in a MAC Protocol Data Units (PDUs); sending a request message for changing the first negotiated maximum size to a receiving device using the transceiver, wherein the request message comprises at least one of a second negotiated maximum size, connection identifier information and sequence number information; and receiving a response message confirming change from the first negotiated maximum size to the second negotiated maximum size from the receiving device.

In the transmitting device. the packet size negotiation module is configured for disabling transmission of MAC PDUs containing one or more unfragmented MAC SDUs upon determining the need for change in the first negotiated maximum size.

In the transmitting device, the packet size negotiation module is configured for disabling packing of multiple unfragmented MAC SDUs in a MAC PDU upon determining the need for change in the first negotiated maximum size.

In the transmitting device, the packet size negotiation module is further configured for determining a sequence number of the last MAC PDU transmitted to the receiving device prior to transmission of the request message.

In the transmitting device, the memory comprises a MAC PDU generation module configured for forming one or more MAC PDUs upon receiving the response message, wherein each of the one or more MAC PDUs contains one or more unfragmented MAC SDUs built based on the second negotiated maximum size, and wherein the sequence number of the one or more MAC PDUs is greater than sequence number of last MAC PDU transmitted prior to transmission of the request message.

In the transmitting device, the transceiver is configured for transmitting the one or more MAC PDUs which contains the one or more unfragmented MAC SDUs to the receiving device via the transceiver so that the one or more unfragmented MAC SDUs are decoded by the receiving device from each of the one or more MAC PDUs based on the second negotiated maximum size.

In the transmitting device, the packet size negotiation module is configured for: determining total number of MAC PDUs carrying one or more unfragmented MAC SDUs built based on the first negotiated maximum size to be transmitted to the receiving device prior to transmission of one or more MAC PDUs containing one or more unfragmented MAC SDUs whose size is less than or equal to the second negotiated maximum size; and transmitting the total number of MAC PDUs carrying the one or more unfragmented MAC SDUs to the receiving device via the transceiver.

In the transmitting device, the MAC PDU generation module is configured for forming one or more MAC PDUs upon transmission of the total number of MAC PDUs, wherein each of the one or more MAC PDUs contains one or more unfragmented MAC SDUs built based on the second negotiated maximum size, and wherein the sequence number of the one or more MAC PDUs is greater than the sequence number of the last MAC PDU transmitted prior to transmission of the one or more MAC PDUs.

In the transmitting device, the transceiver is configured for transmitting the one or more MAC PDUs which contains the one or more unfragmented MAC SDUs to the receiving device so that the one or more unfragmented MAC SDU is decoded by the receiving device from each of the one or more MAC PDUs based on the second negotiated maximum size.

In accordance with an aspect of the present invention, a method for changing negotiated maximum size of unfragmented Medium Access Control (MAC) Service Data Unit (SDU) received in a MAC Protocol Data Unit (PDU) is provided. The method includes determining, by a receiving device, a need to change first negotiated maximum size of unfragmented MAC SDUs transmitted in MAC PDUs by a transmitting device; sending a first request message for changing the first negotiated maximum size to the transmitting device, wherein the first request message for changing the first negotiated maximum size comprises at least one of a second negotiated maximum size and connection identifier information; receiving a second request message from the transmitting device in response to the first request message, wherein the second request message comprises at least one of the second negotiated maximum size, sequence number information and the connection identifier information; and sending a response message confirming change from the first negotiated maximum size to the second negotiated maximum size to the transmitting device in response to the second request message.

In the method, sending the first request message for changing the first negotiated maximum size to the transmitting device comprises disabling transmission of MAC PDUs containing one or more unfragmented MAC SDU by the transmitting device upon receiving the first request message.

In the method, sending the first request message for changing the first negotiated maximum size to the transmitting device comprises disabling packing of multiple unfragmented MAC SDUs in a MAC PDU whose size is equal to the first negotiated maximum size by the transmitting device upon receiving the first request message.

In the method, the method further comprises receiving one or more MAC PDUs which contains one or more unfragmented MAC SDUs built based on the second negotiated maximum size from the transmitting device, wherein the sequence number of the one or more MAC PDUs is greater than sequence number of the last MAC PDU transmitted prior to transmission of the first request message indicated in the sequence information; and decoding the one or more unfragmented MAC SDU from each of the one or more MAC PDUs based on the second negotiated maximum size.

In the method, the method further comprises receiving one or more MAC PDUs which contains one or more unfragmented MAC SDUs built based on the first negotiated maximum size from the transmitting device, wherein the sequence number of the one or more MAC PDUs is less than or equal to the sequence number of the last MAC PDU transmitted prior to transmission of the first request message as indicated in the sequence information; and decoding the one or more unfragmented MAC SDUs from each of the one or more MAC PDUs based on the first negotiated maximum size.

In the method, the method further comprises receiving one or more MAC PDUs which contains one or more unfragmented MAC SDUs built based on first negotiated maximum size from the transmitting device, wherein the sequence number of the one or more MAC PDUs is less than or equal to sum of the sequence number of the last transmitted MAC PDU and the total number of MAC PDUs transmitted prior to transmission of MAC PDUs built using the second negotiated maximum size as indicated in the sequence information; and decoding the one or more unfragmented MAC SDUs from each of the one or more MAC PDUs based on the first negotiated maximum size.

In the method, the method further comprises receiving one or more MAC PDUs which contains one or more unfragmented MAC SDUs built based on the second negotiated maximum size from the transmitting device, wherein the sequence number of the one or more MAC PDUs is greater than sum of the sequence number of the last transmitted MAC PDU and the total number of MAC PDUs transmitted prior to transmission of MAC PDUs built using the second negotiated maximum size as indicated in the sequence information; and decoding the one or more unfragmented MAC SDUs from each of the one or more MAC PDUs based on the second negotiated maximum size.

In accordance with another aspect of the present invention, a receiving device comprises a transceiver; a processor; and memory coupled to the processor, wherein the memory includes a packet size negotiation module configured for: determining a need to change first negotiated maximum size of unfragmented Medium Access Control (MAC) Service Data Units (SDUs) transmitted in MAC Protocol Data Units (PDUs) by a transmitting device; sending a first request message for changing the first negotiated maximum size to the transmitting device using the transceiver, wherein the first request message for changing the first negotiated maximum size comprises at least one of a second negotiated maximum size and connection identifier information; receiving a second request message from the transmitting device in response to the first request message, wherein the second request message comprises at least one of the second negotiated maximum size, sequence number information and the connection identifier information; and sending a response message confirming change from the first negotiated maximum size to the second negotiated maximum size to the transmitting device in response to the second request message.

In the receiving device, the transceiver is configured for receiving one or more MAC PDUs which contains one or more unfragmented MAC SDUs built based on the second negotiated maximum size from the transmitting device, wherein the sequence number of the one or more MAC PDUs is greater than sequence number of the last MAC PDU transmitted prior to transmission of the first request message indicated in the sequence information.

In the receiving device, the memory includes a MAC PDU processing module configured for decoding the one or more unfragmented MAC SDU from each of the one or more MAC PDUs based on the second negotiated maximum size.

In the receiving device, the transceiver is configured for receiving one or more MAC PDUs which contains one or more unfragmented MAC SDUs built based on the first negotiated maximum size from the transmitting device, wherein the sequence number of the one or more MAC PDUs is less than or equal to the sequence number of the last MAC PDU transmitted prior to transmission of the first request message as indicated in the sequence information.

In the receiving device, the memory includes a MAC PDU processing module configured for decoding the one or more unfragmented MAC SDUs from each of the one or more MAC PDUs based on the first negotiated maximum size.

In the receiving device, the transceiver is configured for receiving one or more MAC PDUs which contains one or more unfragmented MAC SDUs built based on first negotiated maximum size from the transmitting device, wherein the sequence number of the one or more MAC PDUs is less than or equal to sum of the sequence number of the last transmitted MAC PDU and the total number of MAC PDUs transmitted prior to transmission of MAC PDUs built using the second negotiated maximum size as indicated in the sequence information.

In the receiving device, the memory includes a MAC PDU processing module configured for decoding the one or more unfragmented MAC SDUs from each of the one or more MAC PDUs based on the first negotiated maximum size.

In the receiving device, the transceiver is configured for receiving one or more MAC PDUs which contains one or more unfragmented MAC SDUs built based on the second negotiated maximum size from the transmitting device, wherein the sequence number of the one or more MAC PDUs is greater than sum of the sequence number of the last transmitted MAC PDU and the total number of MAC PDUs transmitted prior to transmission of MAC PDUs built using the second negotiated maximum size as indicated in the sequence information.

In the receiving device, the memory includes a MAC PDU processing module configured for decoding the one or more unfragmented MAC SDUs from each of the one or more MAC PDUs based on the second negotiated maximum size.

In accordance with another aspect of the present invention, a method for changing negotiated maximum size of unfragmented Medium Access Control (MAC) Service Data Unit (SDU) transmitted in a MAC Protocol Data Unit (PDU) is provided. The method includes determining a need to change first negotiated maximum size of unfragmented MAC SDUs transmitted in MAC PDUs by a first communication entity; sending a request message for changing the first negotiated maximum size to a second communication entity, wherein the request message comprises at least one of a second negotiated maximum size, connection identifier information and an action time; and receiving a response message confirming change from the first negotiated maximum size to the second negotiated maximum size from the second communication entity.

In the method, the response message comprises at least one of a second negotiated maximum size, the connection identified information and the action time.

In the method, the action time is indicative of a time period after which the second negotiated maximum size is applicable.

In the method, the method further comprises computing the action time by the first communication entity based on time required for completion of ongoing transmissions.

In the method, the method further comprises computing the action time by the second communication entity based on time required for completion of ongoing transmissions.

In the method, the first communication entity is a transmitting device and the second communication entity is a receiving device.

In the method, the first communication entity is a mobile station and the second communication entity is a base station.

In the method, the first communication entity is a base station and the second communication entity is a mobile station.

In the method, sending the request message for changing the first negotiated maximum size to the second communication entity comprises: disabling transmission of MAC PDUs carrying one or more unfragmented MAC SDUs by the first communication entity; and sending the request message for changing the first negotiated maximum size to the second communication entity.

In the method, the method further comprises applying the action time by the first communication entity; building one or more MAC PDUs containing one or more unfragmented MAC SDUs build based on the second negotiated maximum size upon expiry of the action time; and transmitting the one or more MAC PDUs which contains the one or more unfragmented MAC SDUs to the second communication entity so that the one or more unfragmented MAC SDUs are decoded by the second communication entity from each of the one or more MAC PDUs based on the second negotiated maximum size.

In the method, the method further comprises purging ongoing transmissions associated with MAC PDUs carrying one or more unfragmented MAC SDUs build based on the first negotiated maximum size upon expiry of the action time.

In the method, the first communication entity is a receiving device and the second communication entity is a transmitting device.

In the method, the first communication entity is a mobile station and the second communication entity is a base station.

In the method, the first communication entity is a base station and the second communication entity is a mobile station.

In the method, sending the request message for changing the first negotiated maximum size to the second communication entity comprises: sending the request message for changing the first negotiated maximum size to the second communication entity; and disabling transmission of MAC PDUs carrying one or more unfragmented MAC SDUs by the second communication entity.

In the method, the method further comprises receiving one or more MAC PDUs containing one or more unfragmented MAC SDUs built based on the second negotiated maximum size upon expiry of the action time from the second communication entity; and decoding the one or more MAC PDUs which contains the one or more unfragmented MAC SDUs so that the one or more unfragmented MAC SDUs are decoded by the receiving device from each of the one or more MAC PDUs based on the second negotiated maximum size.

In the method, the method further comprises receiving one or more MAC PDUs containing one or more unfragmented MAC SDUs built based on the first negotiated maximum size from the second communication entity during the action time; and decoding the one or more MAC PDUs which contains the one or more unfragmented MAC SDUs based on the first negotiated maximum size.

In the method, the method further comprises decoding one or more MAC PDUs which contains the one or more unfragmented MAC SDUs whose size is less than or equal to the first negotiated maximum size if first transmissions of the one or more MAC PDUs are received before the action time.

In the method, the method further comprises discontinuing allocation of resources for ongoing transmissions associated with MAC PDUs carrying one or more unfragmented MAC SDUs built based on the first negotiated maximum size upon expiry of the action time.

In accordance with another aspect of the present invention, a communication entity comprises a transceiver; a processor; and memory coupled to the processor, wherein the memory includes a packet size negotiation module configured for: determining a need to change first negotiated maximum size of unfragmented Medium Access Control (MAC) Service Data Units (SDUs) transmitted in MAC Protocol Data Units (PDUs); sending a request message for changing the first negotiated maximum size to another communication entity, wherein the request message comprises at least one of a second negotiated maximum size, connection identifier information and an action time; and receiving a response message confirming change from the first negotiated maximum size to the second negotiated maximum size from the second communication entity.

In the communication entity, the response message comprises at least one of a second negotiated maximum size, the connection identified information and the action time In the communication entity, the action time is indicative of a time period after which the second negotiated maximum size is applicable.

In the communication entity, the packet size negotiation module is configured for computing the action time by the first communication entity based on time required for completion of ongoing transmissions.

In the communication entity, the packet size negotiation module is configured for computing the action time by the second communication entity based on time required for completion of ongoing transmissions.

The drawings described herein are for illustration purposes only and are not intended to limit the scope of the present disclosure in any way.

BEST MODE FOR CARRYING OUT THE INVENTION

The present invention provides a method and system for dynamically changing upper bound on size of data packets in wireless communication networks. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
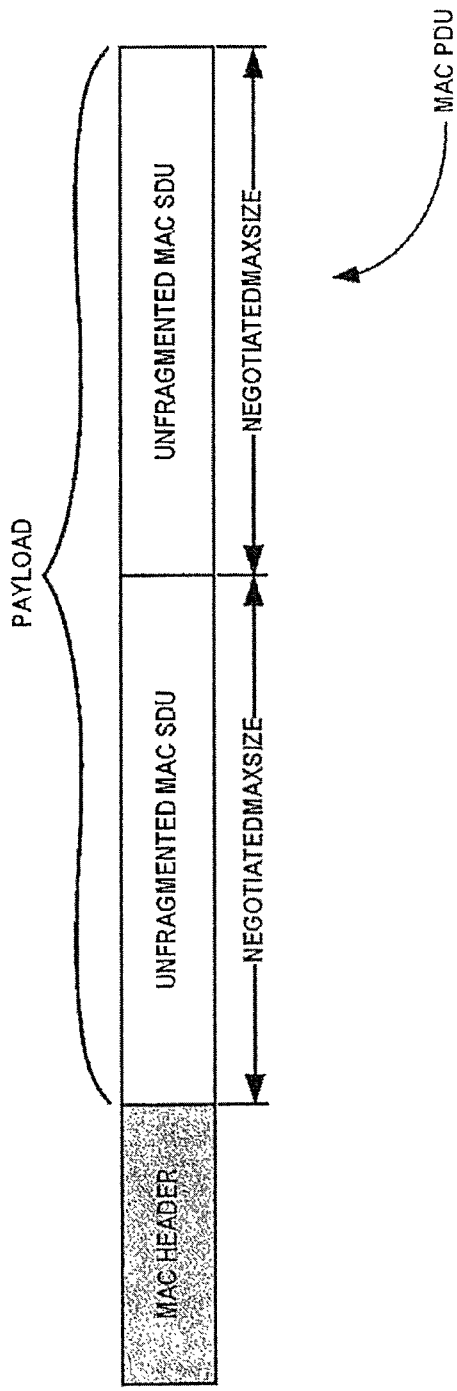
FIG. 1 is a schematic representation of a Medium Access Control (MAC) Protocol Data Unit (PDU) carrying unfragmented MAC Service Data Units (SDUs) with size equal to negotiated maximum size, in the context of the invention.
Figure 2:
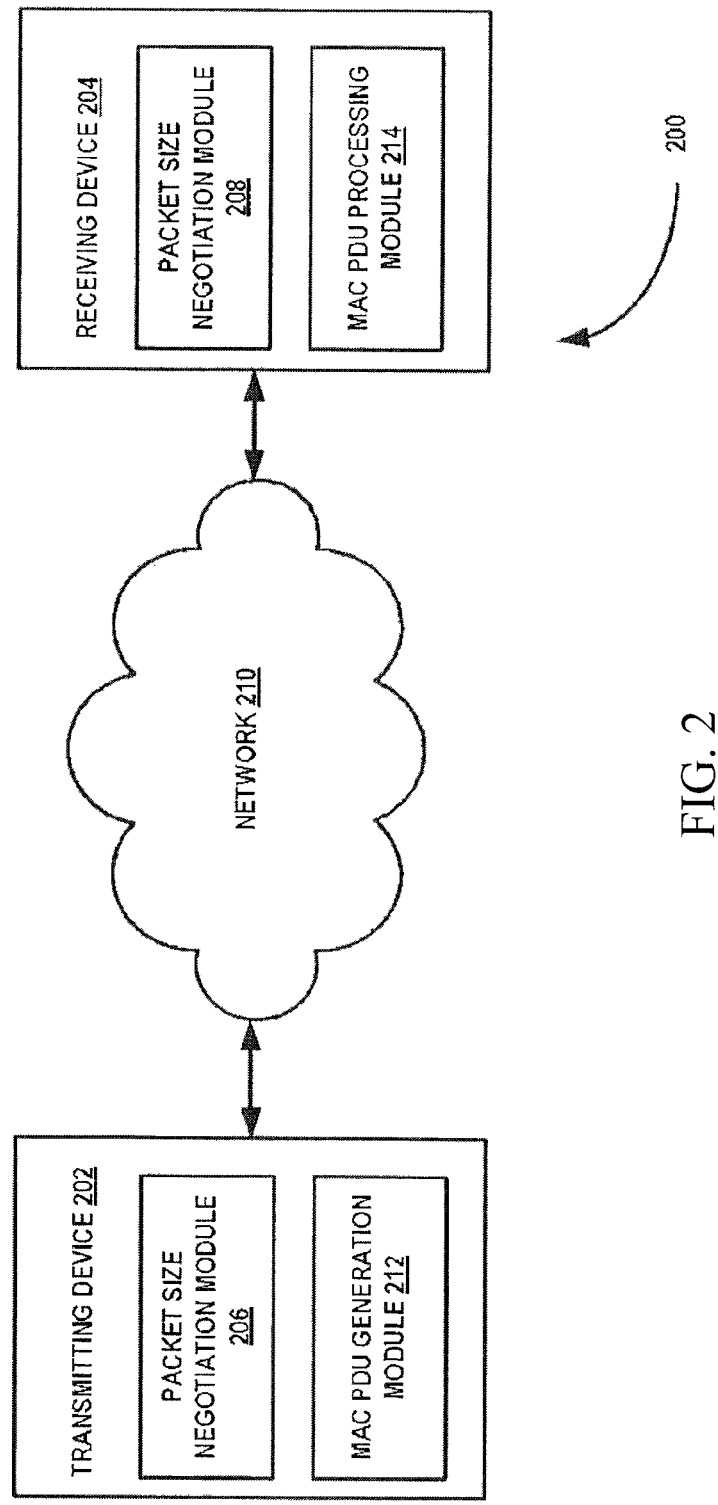
FIG. 2 is a block diagram of a broadband wireless network system, according to one embodiment.

FIG. 2 is a block diagram illustrating a broadband wireless network system 100, according to one embodiment. In FIG. 2, the system 200 includes a transmitting device 202, a receiving device 204, and a wireless network 210. The transmitting device 202 includes a packet size negotiation module 206 and a MAC PDU generation module 212, and the receiving device 204 includes a packet size negotiation module 208 and a MAC PDU generation module 214.

The transmitting device 202 is connected to the receiving device 204 via the wireless network 210. In uplink, the transmitting device 202 may be a mobile station and the receiving device 204 may be a base station depending on the functionality. In downlink, the transmitting device 202 may be a base station and the receiving device 104 may be a mobile station. It can be noted that, the transmitting device 202 and the receiving device 204 is sometimes referred to as a first communication entity and a second communication entity and vice versa.

For the purpose of illustration, consider that a connection is established between the transmitting device 202 and the receiving device 204. Also, consider that the transmitting device 202 builds Medium Access Control (MAC) Protocol Data Units (PDUs) containing one or more unfragmented MAC Service Data Units (SDUs) using negotiated maximum size of P bytes and transmits the MAC PDUs on the established connection. The receiving device 204 determines whether the received MAC PDU contains multiple unfragmented MAC SDUs using negotiated maximum size (P bytes) and size of the payload of the received MAC PDU.

According to one embodiment, the packet size negotiation module 206 in the transmitting device 202 determines a need to change existing negotiated maximum size (i.e., P bytes) for the active connection. For example, the packet size negotiation module 206 may trigger a change in existing negotiated maximum size when size of data packets for an application is switched, a new application is mapped to the active connection, or Maximum Transmission Unit (MTU) of the broadband wireless network 110 is changed. Then, the packet size negotiation module 206 sends a request message indicating a new negotiated maximum size (e.g., Q bytes) for changing the existing negotiated maximum size to the receiving device 204. The packet size negotiation module 208 in the receiving device 204 sends a response message to the transmitting device 202. In one exemplary implementation, the response message carries the connection identifier associated with the active connection and the new negotiated maximum size (e.g., Q bytes). In alternate exemplary implementation, the response message carries the connection identifier associated with the active connection. Accordingly, the MAC PDU generation module 212 and the MAC PDU processing module 214 uses new negotiated maximum size for building MAC PDUs and decoding MAC PDUs respectively based on a predefined parameter (e.g., sequence number/action time) indicated in the request/response message.

According to another embodiment, the packet size negotiation module 208 in the receiving device 204 determines a need to change existing negotiated maximum size (i.e., P bytes) for the active connection. For example, the packet size negotiation module 208 may trigger a change in existing negotiated maximum size when size of data packets for an application is switched, a new application is mapped to the active connection, or MTU of the broadband wireless network 110 is changed.

Then, the packet size negotiation module 208 sends a request message indicating a new negotiated maximum size (e.g., Q bytes) for changing the existing negotiated maximum size to the transmitting device 202. The packet size negotiation module 206 in the transmitting device 202 sends a response message to the transmitting device 202. In one exemplary implementation, the response message carries the connection identifier associated with the active connection and the new negotiated maximum size (e.g., Q bytes). In alternate exemplary implementation, the response message carries the connection identifier associated with the active connection. Accordingly, the MAC PDU generation module 212 and the MAC PDU processing module 214 uses new negotiated maximum size for building MAC PDUs and decoding MAC PDUs respectively based on a predetermined parameter (e.g., sequence number/action time) indicated in the request/response message. The detailed process of dynamically changing the negotiated maximum size using the predefined parameter is described in greater detail in the description that follows.

Figure 3:
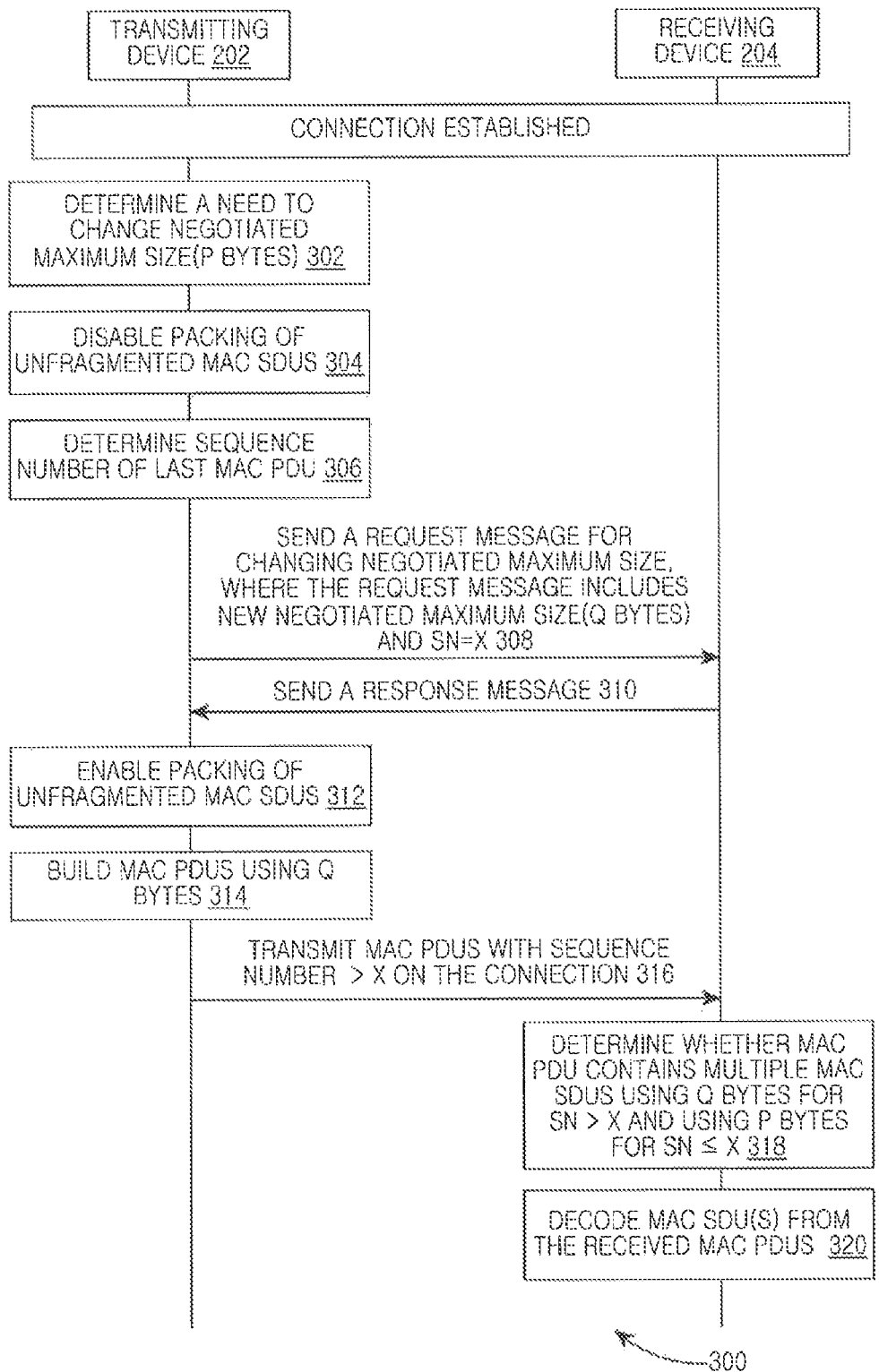
FIG. 3 is a process flowchart illustrating an exemplary method of dynamically changing negotiated maximum size for a connection based on sequence number, according to one embodiment.

FIG. 3 is a process flowchart 300 illustrating an exemplary method of dynamically changing negotiated maximum size for a connection based on sequence number, according to one embodiment. Consider that a connection is established between the transmitting device 202 and the receiving device 204. Also, consider that the transmitting device 202 builds MAC PDUs containing one or more unfragmented MAC SDUs using the negotiated maximum size of P bytes (herein after referred to as first negotiated maximum size) and transmits the MAC PDUs on the established connection.

While the connection is active, the transmitting device 202 determines a need to change upper bound on size of unfragmented MAC SDUs from the first negotiated maximum size (P bytes) to a second negotiated maximum size (Q bytes), at step 302. In one exemplary implementation, the first negotiated maximum size may be less than the second negotiated maximum size. At step 304, the transmitting device 202 disables packing multiple unfragmented MAC SDUs in a MAC PDU to be transmitted on the connection. It can be noted that, the transmitting device 202 continues to build MAC PDUs carrying a single fragmented MAC SDU or unfragmented MAC SDU when the packing is disabled.

At step 306, the transmitting device 202 determines a sequence number (x) of last MAC PDU transmitted on the connection prior to sending a request for change in negotiated maximum size. At step 308, the transmitting device 202 sends a request message for changing the negotiated maximum size to the receiving device 204. The request message includes the second negotiated maximum size (i.e., Q bytes), and the sequence number (SN=x) of last MAC PDU transmitted on the connection. The request message may also include a connection identifier associated with the active connection.

At step 310, the receiving device 204 sends a response message to the transmitting device 202 upon receiving the request message. The response message may include the second negotiated maximum size (i.e., Q bytes). The response message may also include the connection identifier associated with the active connection. The receiving device 204 ensures that the response message is reliably sent to the transmitting device 202. Thus, both the receiving device 204 and the transmitting device 202 are in sync regarding the second negotiated maximum size and the sequence number.

At step 312, the transmitting device 202 enables packing of multiple unfragmented MAC SDUs in a MAC PDU upon receiving the response message from the receiving device 204. At step 314, the transmitting device 202 forms MAC PDUs, where each of the MAC PDUs contains one or more unfragmented MAC SDUs whose size is less than or equal to Q bytes (i.e., the second negotiated maximum size) and where sequence number of each MAC PDU is greater than x. At step 316, the transmitting device 202 transmits the MAC PDUs with sequence number greater than x on the connection.

At step 318, the receiving device 204, upon receiving a MAC PDU with sequence number greater than x, determines whether multiple unfragmented MAC SDUs are packed in the payload of the MAC PDU based on the second negotiated maximum size (i.e., Q bytes) and the size of the payload. It can be noted that, when the receiving device 204 receives a MAC PDU with sequence number less than or equal to x from the transmitting device 202 during or after change of negotiated maximum size, the receiving device 204 determines whether multiple unfragmented MAC SDUs are packed in payload of the MAC PDU based on the first negotiated maximum size (i.e., P bytes) and the size of the payload, at step 318. At step 320, the receiving device 204 decodes one or more unfragmented MAC SDUs from the payload of the MAC PDU.

Figure 4:
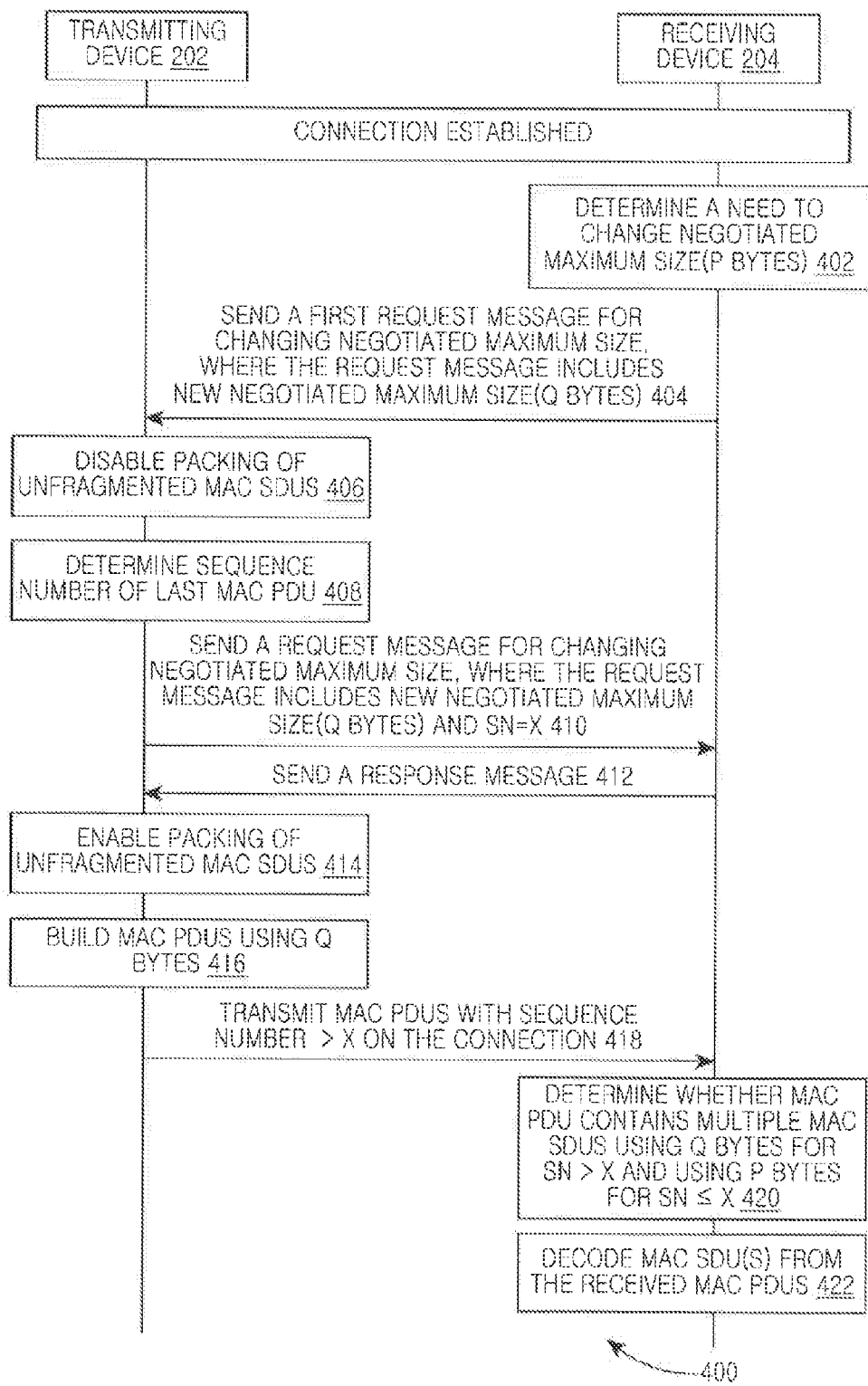
FIG. 4 is a process flowchart illustrating an exemplary method of dynamically changing negotiated maximum size for a connection based on sequence number, according to another embodiment.

FIG. 4 is a process flowchart 400 illustrating an exemplary method of dynamically changing negotiated maximum size for a connection based on sequence number, according to another embodiment. The process flow 400 is similar to the process flow 300 illustrated in FIG. 3, except that the receiving device 204 initiates change in negotiated maximum size. While the connection is active, the receiving device 204 determines a need to change upper bound on size of unfragmented MAC SDUs from the first negotiated maximum size (P bytes) to a second negotiated maximum size (Q bytes), at step 402. At step 404, the receiving device 204 sends a first request message for changing the negotiated maximum size to the transmitting device 202. The first request message indicates the second negotiated maximum size (i.e., Q bytes). The first request message may also include the connection identifier associated with the active connection.

At step 406, the transmitting device 202 disables packing multiple unfragmented MAC SDUs in a MAC PDU to be transmitted on the connection upon receiving the first request message. It can be noted that, the transmitting device 202 continues to build MAC PDUs carrying a single fragmented MAC SDU or unfragmented MAC SDU when the packing is disabled. At step 408, the transmitting device 202 determines a sequence number (x) of last MAC PDU transmitted on the connection prior to receiving the first request message for change in negotiated maximum size. At step 410, the transmitting device 202 sends a second request message indicating the second negotiated maximum size (i.e., Q bytes) and the sequence number (SN=x) of the last MAC PDU transmitted on the connection to the receiving device 204. The second request message may also include the connection identifier associated with the active connection.

At step 412, the receiving device 204 sends a response message to the transmitting device 202 upon receiving the second request message. The response message may include the second negotiated maximum size (i.e., Q bytes) and the connection identifier associated with the active connection. The receiving device 204 ensures that the response message is reliably sent to the transmitting device 202. Thus, both the receiving device 204 and the transmitting device 202 are in sync regarding the second negotiated maximum size and the sequence number.

At step 414, the transmitting device 202 enables packing of multiple unfragmented MAC SDUs in a MAC PDU upon receiving the response message from the receiving device 204. At step 416, the transmitting device 202 forms MAC PDUs, where each of the MAC PDUs contains one or more unfragmented MAC SDUs whose size is less than or equal to Q bytes (i.e., the second negotiated maximum size) and where sequence number of each MAC PDU is greater than x. At step 418, the transmitting device 202 transmits the MAC PDUs with sequence number greater than x on the connection.

At step 420, the receiving device 204, upon receiving a MAC PDU with sequence number greater than x, determines whether multiple unfragmented MAC SDUs are packed in the payload of the MAC PDU based on the second negotiated maximum size (i.e., Q bytes) and the size of the payload. It can be noted that, at step 420, when the receiving device 204 receives a MAC PDU with sequence number less than or equal to x from the transmitting device 202 during or after change of negotiated maximum size, the receiving device 204 determines whether multiple unfragmented MAC SDUs are packed in payload of the MAC PDU based on the first negotiated maximum size (i.e., P bytes) and the size of the payload. At step 422, the receiving device 204 decodes one or more unfragmented MAC SDUs from the payload of the MAC PDU.

Figure 5:
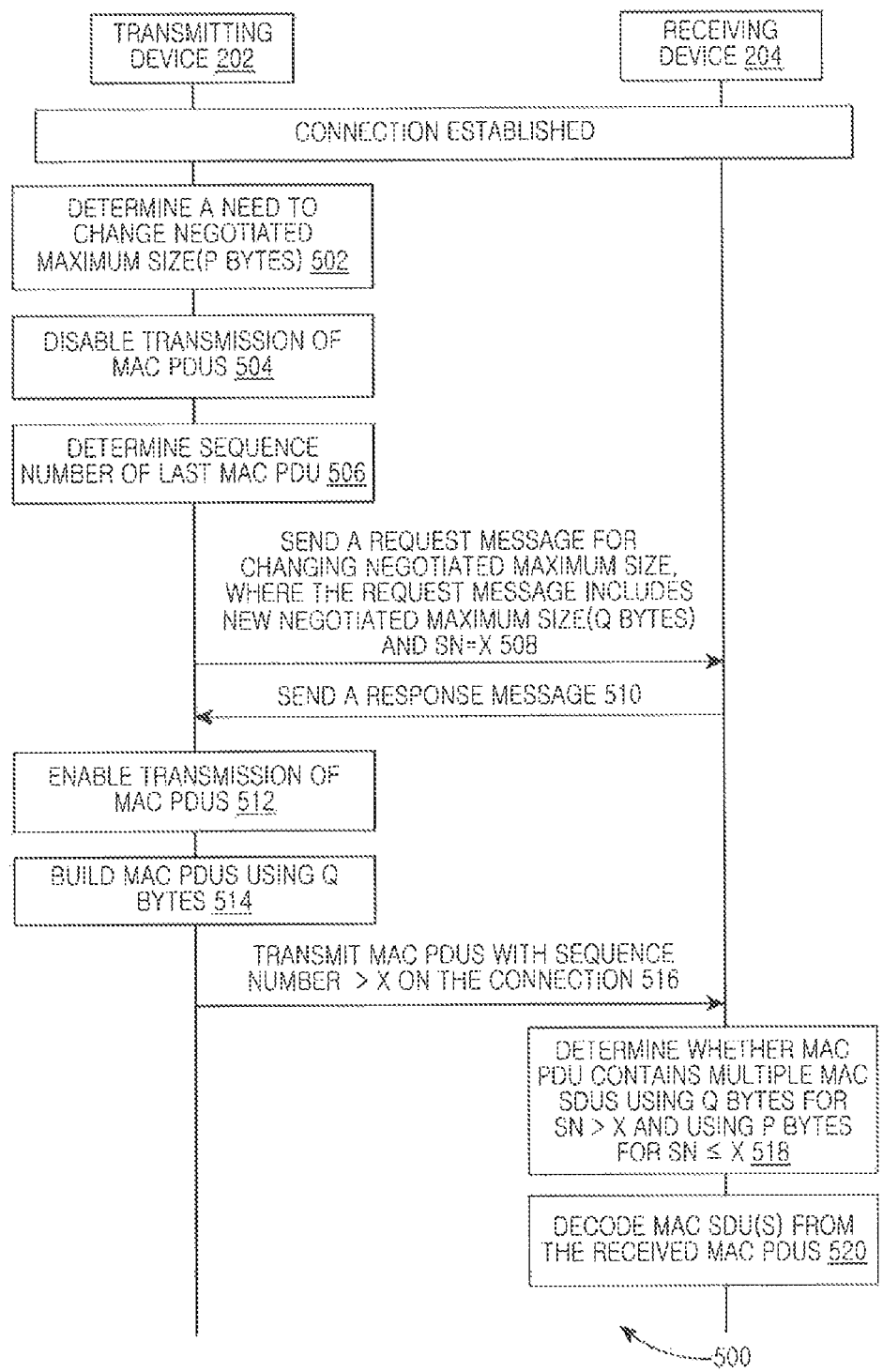
FIG. 5 is a process flowchart illustrating another exemplary method of dynamically changing negotiated maximum size for a connection based on sequence number, according to one embodiment.

FIG. 5 is a process flowchart 500 illustrating another exemplary method of dynamically changing negotiated maximum size for a connection based on sequence number, according to one embodiment. Consider that a connection is established between the transmitting device 202 and the receiving device 204. Also, consider that the transmitting device 202 builds MAC PDUs containing one or more unfragmented MAC SDUs using the negotiated maximum size of P bytes (herein after referred to as first negotiated maximum size) and transmits the MAC PDUs on the established connection.

While the connection is active, the transmitting device 202 determines a need to change upper bound on size of unfragmented MAC SDUs from the first negotiated maximum size (P bytes) to a second negotiated maximum size (Q bytes), at step 502. At step 504, the transmitting device 202 disables building and transmission of MAC PDUs on the connection.

At step 506, the transmitting device 202 determines a sequence number (x) of last MAC PDU transmitted on the connection prior to disabling transmission of MAC PDUs. At step 508, the transmitting device 202 sends a request message for changing the negotiated maximum size to the receiving device 204. The request message indicates the second negotiated maximum size (i.e., Q bytes) and the sequence number (SN=x) of last MAC PDU transmitted on the connection prior to sending the request message. The request message may also include the connection identifier associated with the active connection.

At step 510, the receiving device 204 sends a response message to the transmitting device 202 upon receiving the request message. The response message may include the second negotiated maximum size (i.e., Q bytes) and the connection identifier associated with the active connection. The receiving device 204 ensures that the response message is reliably sent to the transmitting device 202. Thus, both the receiving device 204 and the transmitting device 202 are in sync regarding the second negotiated maximum size and the sequence number.

At step 512, the transmitting device 202 enables transmission of MAC PDUs with sequence number greater than x upon receiving the response message from the receiving device 204. At step 514, the transmitting device 202 forms MAC PDUs, where each of the MAC PDUs contains one or more unfragmented MAC SDUs whose size is less than or equal to Q bytes (i.e., the second negotiated maximum size). At step 516, the transmitting device 202 transmits the MAC PDUs with sequence number greater than x on the connection.

At step 518, the receiving device 204, upon receiving a MAC PDU with sequence number greater than x, determines whether multiple unfragmented MAC SDUs are packed in the payload of the MAC PDU based on the second negotiated maximum size (i.e., Q bytes) and the size of the payload. It can be noted that, at step 518, when the receiving device 204 receives a MAC PDU with sequence number less than or equal to x from the transmitting device 202 during or after change of negotiated maximum size, the receiving device 204 determines whether multiple unfragmented MAC SDUs are packed in the payload of the MAC PDU based on the first negotiated maximum size (i.e., P bytes) and the size of the payload. At step 520, the receiving device 204 decodes one or more unfragmented MAC SDUs from the payload of the MAC PDU.

Figure 6:
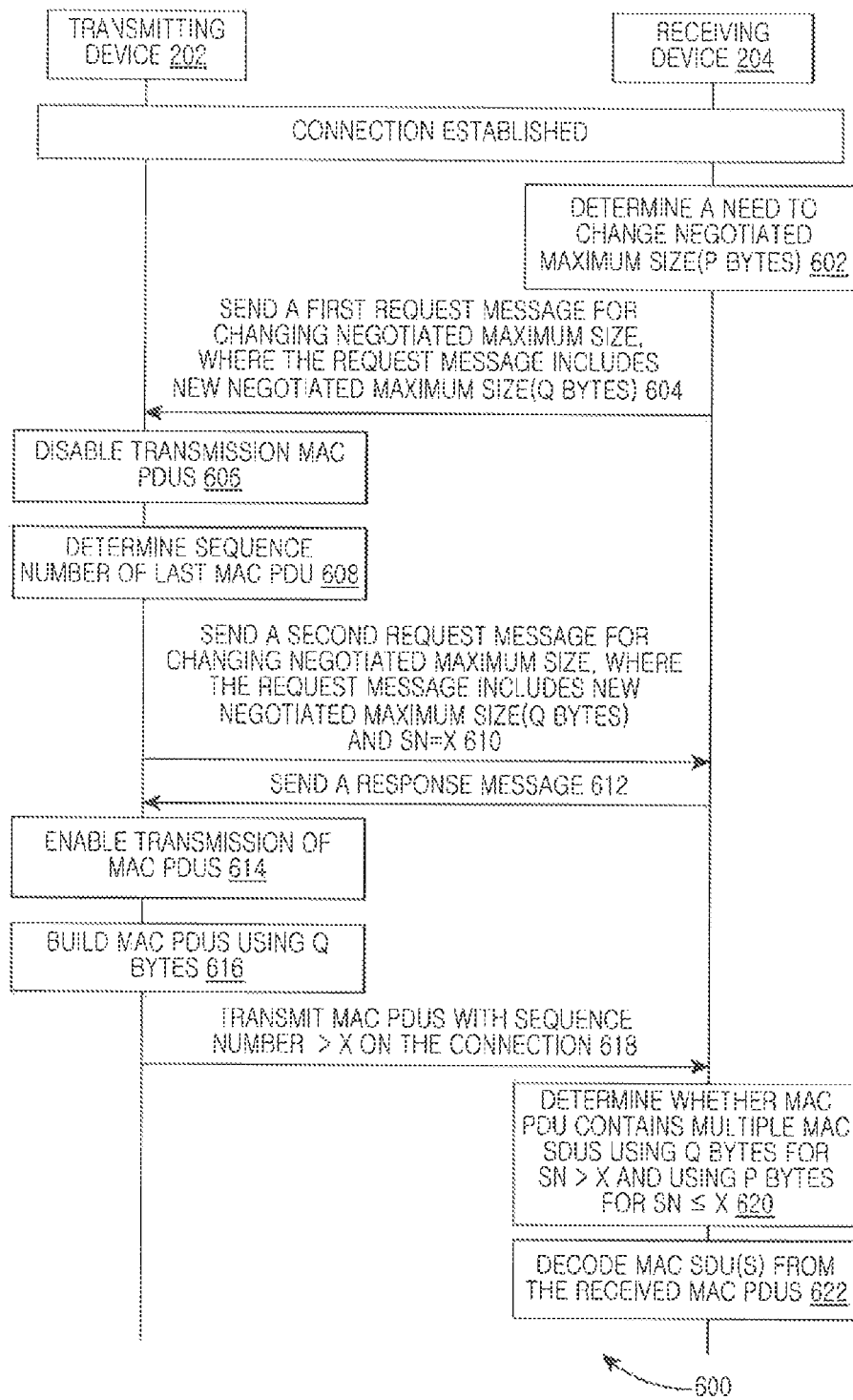
FIG. 6 is a process flowchart illustrating another exemplary method of dynamically changing negotiated maximum size for a connection based on sequence number, according to another embodiment.

FIG. 6 is a process flowchart 600 illustrating another exemplary method of dynamically changing negotiated maximum size for a connection based on sequence number, according to another embodiment. The process flow 600 is similar to the process flow 500 illustrated in FIG. 5, except that the receiving device 204 initiates change in negotiated maximum size. While the connection is active, the receiving device 204 determines a need to change upper bound on size of unfragmented MAC SDUs from the first negotiated maximum size (P bytes) to a second negotiated maximum size (Q bytes), at step 602. At step 604, the receiving device 204 sends a first request message for changing the negotiated maximum size to the transmitting device 202. The first request message indicates the second negotiated maximum size (i.e., Q bytes). The first request message may also include the connection identifier associated with the active connection.

At step 606, the transmitting device 202 disables building and transmission of MAC PDUs on the connection upon receiving the first request message. At step 608, the transmitting device 202 determines a sequence number (x) of last MAC PDU transmitted on the connection prior to receiving the first request message for change in negotiated maximum size. At step 610, the transmitting device 202 sends a second request message indicating the second negotiated maximum size (i.e., Q bytes) and the sequence number (SN=x) of the last MAC PDU transmitted on the connection to the receiving device 204. The second request message may also include the connection identifier associated with the active connection.

At step 612, the receiving device 204 sends a response message to the transmitting device 202 upon receiving the second request message. The response message may include the second negotiated maximum size (i.e., Q bytes) and the connection identifier associated with the active connection. The receiving device 204 ensures that the response message is reliably sent to the transmitting device 202. Thus, both the receiving device 204 and the transmitting device 202 are in sync regarding the second negotiated maximum size and the sequence number.

At step 614, the transmitting device 202 enables transmission of MAC PDUs with sequence number greater than x upon receiving the response message from the receiving device 204. At step 616, the transmitting device 202 forms MAC PDUs, where each of the MAC PDUs contains one or more unfragmented MAC SDUs whose size is less than or equal to Q bytes (i.e., the second negotiated maximum size). At step 618, the transmitting device 202 transmits the MAC PDUs with sequence number greater than x on the connection.

At step 620, the receiving device 204, upon receiving a MAC PDU with sequence number greater than x, determines whether multiple unfragmented MAC SDUs are packed in the payload of the MAC PDU based on the second negotiated maximum size (i.e., Q bytes) and the size of the payload. It can be noted that, at step 620, when the receiving device 204 receives a MAC PDU with sequence number less than or equal to x from the transmitting device 202 during or after change of negotiated maximum size, the receiving device 204 determines whether multiple unfragmented MAC SDUs are packed in payload of the MAC PDU based on the first negotiated maximum size (i.e., P bytes) and the size of the payload. At step 622, the receiving device 204 decodes one or more unfragmented MAC SDUs from the payload of the MAC PDU.

Figure 7:
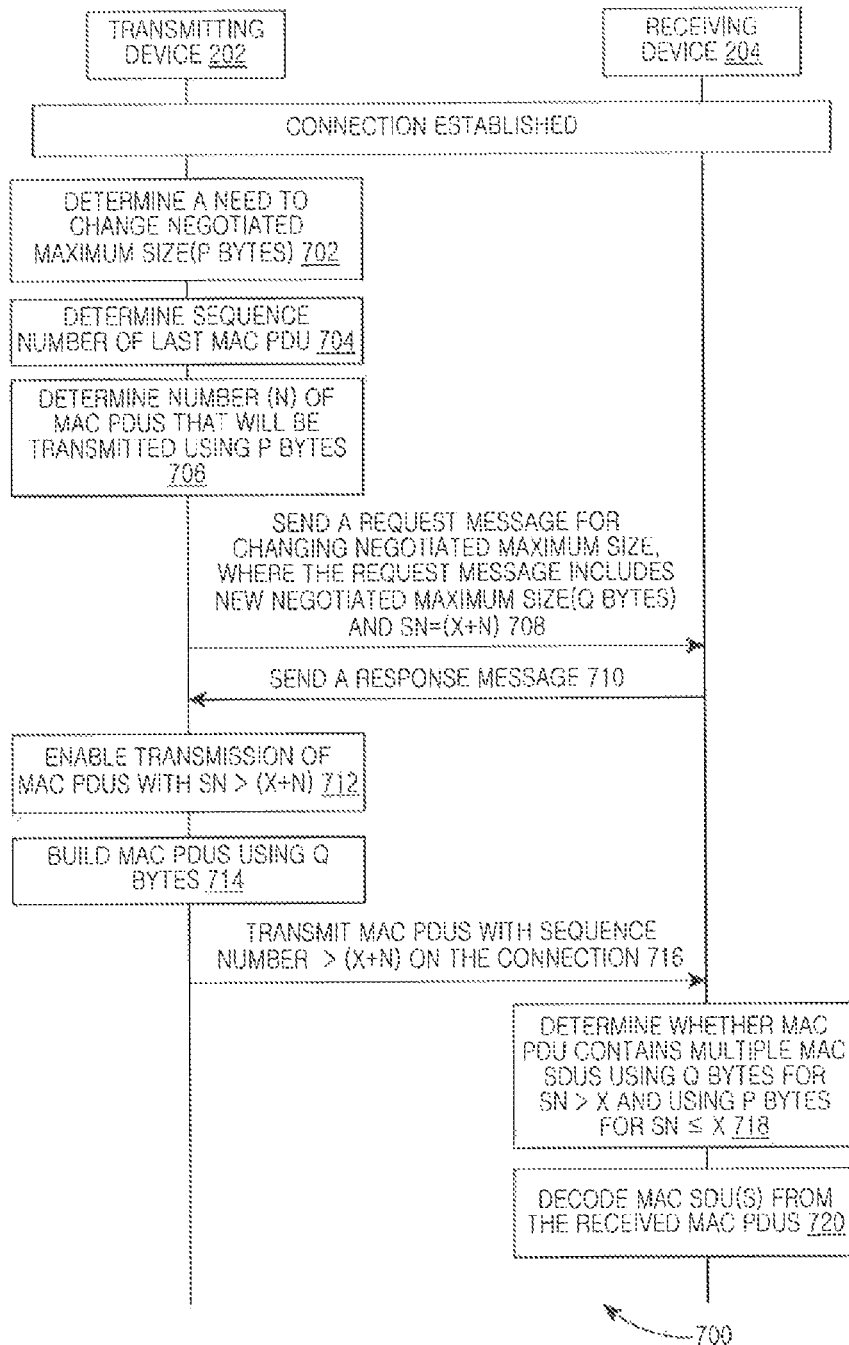
FIG. 7 is a process flowchart illustrating yet another exemplary method of dynamically changing negotiated maximum size for a connection based on sequence number, according to one embodiment.

FIG. 7 is a process flowchart 700 illustrating yet another exemplary method of dynamically changing negotiated maximum size for a connection based on sequence number, according to one embodiment. Consider that a connection is established between the transmitting device 202 and the receiving device 204. Also, consider that the transmitting device 202 builds MAC PDUs containing one or more unfragmented MAC SDUs using the negotiated maximum size of P bytes (herein after referred to as first negotiated maximum size) and transmits the MAC PDUs on the established connection.

While the connection is active, the transmitting device 202 determines a need to change upper bound on size of unfragmented MAC SDUs from the first negotiated maximum size (P bytes) to a second negotiated maximum size (Q bytes), at step 702. At step 704, the transmitting device 202 determines a sequence number (x) of last MAC PDU transmitted on the connection.

At step 706, the transmitting device 202 determines number of MAC PDUs that is going to be transmitted on the connection using the first negotiated maximum size (i.e., P bytes) after transmission of the last MAC PDU with sequence number equal to x. At step 708, the transmitting device 202 sends a request message for changing the negotiated maximum size to the receiving device 204. The request message indicates the second negotiated maximum size (i.e., Q bytes), the sequence number (SN=x) of last MAC PDU transmitted on the connection prior to sending the request message plus total number (n) of MAC PDUs that is going to be transmitted using the first negotiated maximum size after transmission of the last MAC PDU with sequence number equal to x. It can be noted that, the transmitting device 202 continues to build and transmit MAC PDUs with sequence number less than or equal to (x+n) using the first negotiated maximum size (i.e., P bytes) even after sending the request message. The request message may also include the connection identifier.

At step 710, the receiving device 204 sends a response message to the transmitting device 202 upon receiving the request message. The response message may include the second negotiated maximum size (i.e., Q bytes) and the connection identifier associated with the active connection. The receiving device 204 ensures that the response message is reliably sent to the transmitting device 202. Thus, both the receiving device 204 and the transmitting device 202 are in sync regarding the second negotiated maximum size and the sequence number (x+n) of the last MAC PDU with the first negotiated size.

At step 712, the transmitting device 202 enables transmission of MAC PDUs with SN>(x+n) upon receiving the response message from the receiving device 204. At step 714, the transmitting device 202 forms MAC PDUs, where each of the MAC PDUs contains one or more unfragmented MAC SDUs whose size is less than or equal to Q bytes (i.e., the second negotiated maximum size). At step 716, the transmitting device 202 transmits the MAC PDUs with sequence number greater than (x+n) on the connection. It can be noted that, the transmitting device 202 may continue to build and transmit pending MAC PDUs with sequence number less than or equal to (x+n) using the first negotiated maximum size (i.e., P bytes) even after receiving the response message.

At step 718, the receiving device 204, upon receiving a MAC PDU with sequence number greater than (x+n), determines whether multiple unfragmented MAC SDUs are packed in the payload of the MAC PDU based on the second negotiated maximum size (i.e., Q bytes) and the size of the payload. It can be noted that, at step 718, when the receiving device 204 receives a MAC PDU with sequence number less than or equal to (x+n) from the transmitting device 202 during or after change of negotiated maximum size, the receiving device 204 determines whether multiple unfragmented MAC SDUs are packed in the payload of the MAC PDU based on the first negotiated maximum size (i.e., P bytes) and the size of the payload. At step 720, the receiving device 204 decodes one or more unfragmented MAC SDUs from the payload of the MAC PDU.

Figure 8:
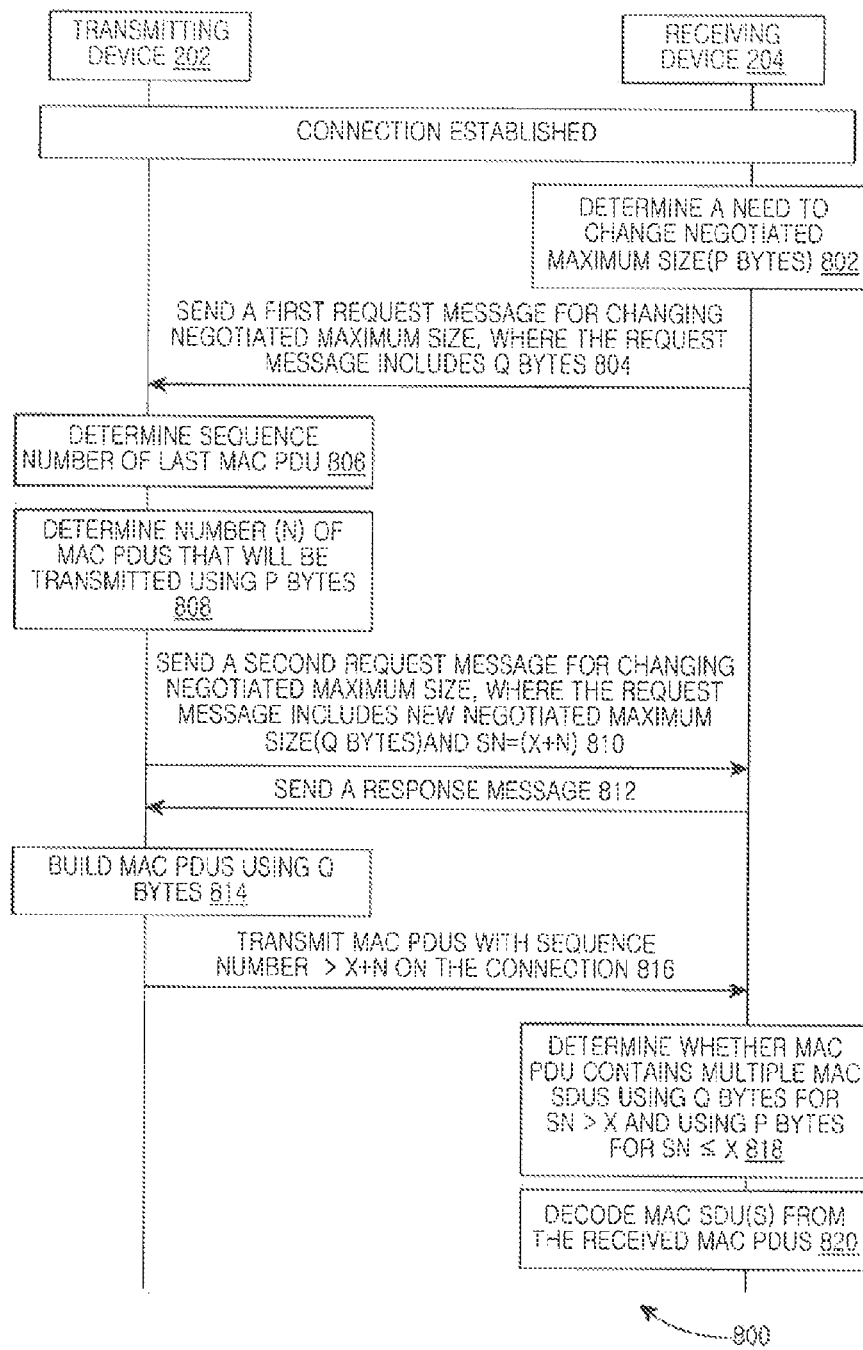
FIG. 8 is a process flowchart illustrating yet another exemplary method of dynamically changing negotiated maximum size for a connection based on sequence number, according to another embodiment.

FIG. 8 is a process flowchart 800 illustrating yet another exemplary method of dynamically changing negotiated maximum size for a connection based on sequence number, according to another embodiment. The process flow 800 is similar to the process flow 700 illustrated in FIG. 7, except that the receiving device 204 initiates change in negotiated maximum size. While the connection is active, the receiving device 204 determines a need to change upper bound on size of unfragmented MAC SDUs from the first negotiated maximum size (P bytes) to a second negotiated maximum size (Q bytes), at step 802. At step 804, the receiving device 204 sends a first request message for changing the negotiated maximum size to the transmitting device 202. The first request message indicates the second negotiated maximum size (i.e., Q bytes). The first request message may also include the connection identifier associated with the active connection.

At step 806, the transmitting device 202 determines a sequence number of a last MAC PDU transmitted on the connection upon receiving the first request message. At step 808, the transmitting device 202 determines number of MAC PDUs that is going to be transmitted on the connection using the first negotiated maximum size (i.e., P bytes) after transmission of the last MAC PDU with sequence number equal to x. At step 810, the transmitting device 202 sends a second request message for changing the negotiated maximum size to the receiving device 204. The request message indicates the second negotiated maximum size (i.e., Q bytes), the sequence number (SN=x) of last MAC PDU transmitted on the connection prior to sending the request message and total number (n) of MAC PDUs that is going to be transmitted using the first negotiated maximum size after transmission of the last MAC PDU with sequence number equal to x. The second request message may also include the connection identifier associated with the active connection. It can be noted that, the transmitting device 202 continues to build and transmit MAC PDUs with sequence number less than or equal to (x+n) using the first negotiated maximum size (i.e., P bytes) even after sending the second request message.

At step 812, the receiving device 204 sends a response message to the transmitting device 202 upon receiving the second request message. The response message may include the second negotiated maximum size (i.e., Q bytes) and the connection identifier associated with the active connection. The receiving device 204 ensures that the response message is reliably sent to the transmitting device 202. Thus, both the receiving device 204 and the transmitting device 202 are in sync regarding the second negotiated maximum size and the sequence number of the last MAC PDU with the first negotiated maximum size.

At step 814, the transmitting device 202 forms MAC PDUs, where each of the MAC PDUs contains one or more unfragmented MAC SDU whose size is less than or equal to Q bytes (i.e., the second negotiated maximum size). At step 816, the transmitting device 202 transmits the MAC PDUs with sequence number greater than (x+n) on the connection. It can be noted that, the transmitting device 202 continues to build and transmit pending MAC PDUs with sequence number less than or equal to (x+n) using the first negotiated maximum size (i.e., P bytes) even after receiving the response message.

At step 818, the receiving device 204, upon receiving a MAC PDU with sequence number greater than (x+n), determines whether multiple unfragmented MAC SDUs are packed in the payload of the MAC PDU based on the second negotiated maximum size (i.e., Q bytes) and the size of the payload. It can be noted that, at step 818, when the receiving device 204 receives a MAC PDU with sequence number less than or equal to (x+n) from the transmitting device 202 during or after change of negotiated maximum size, the receiving device 204 determines whether multiple unfragmented MAC SDUs are packed in payload of the MAC PDU based on the first negotiated maximum size (i.e., P bytes) and the size of the payload. At step 820, the receiving device 204 decodes one or more unfragmented MAC SDUs from the payload of the MAC PDU.

Figure 9A:
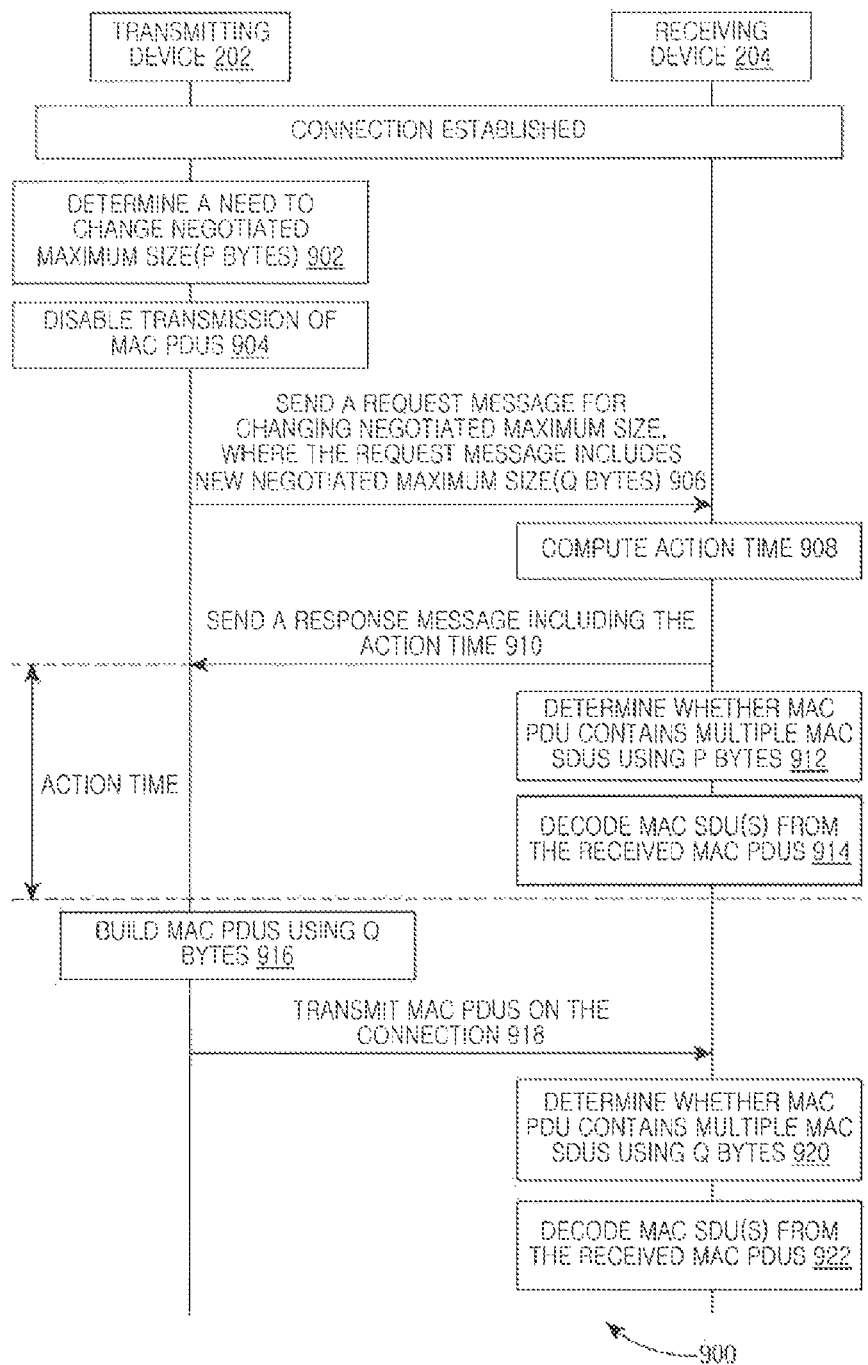
FIGS. 9A-C are process flowcharts illustrating an exemplary method of dynamically changing negotiated maximum size for a connection based on action time, according to one embodiment.

FIG. 9A is a process flowchart 900 illustrating an exemplary method of dynamically changing negotiated maximum size for a connection based on action time, according to one embodiment. Consider that a connection is established between the transmitting device 202 and the receiving device 204. Also, consider that the transmitting device 202 builds MAC PDUs containing one or more unfragmented MAC SDUs using the negotiated maximum size of P bytes (herein after referred to as first negotiated maximum size) and transmits the MAC PDUs on the established connection. It can be noted that, in uplink, the transmitting device 202 is a mobile station and the receiving device is a base station. In downlink, the transmitting device 202 is a base station and the receiving device 204 is a mobile station.

While the connection is active, the transmitting device 202 determines a need to change upper bound on size of unfragmented MAC SDUs from the first negotiated maximum size (P bytes) to a second negotiated maximum size (Q bytes), at step 902. At step 904, the transmitting device 202 disables transmissions of MAC PDUs containing unfragmented MAC SDUs on the connection.

At step 906, the transmitting device 202 sends a request message for changing the negotiated maximum size to the receiving device 204, where the request message indicates the second negotiated maximum size (i.e., Q bytes) and/or the connection identifier associated with the active connection. At step 908, the receiving device 204, after receiving the request message, computes an action time for allowing completion of ongoing transmissions. The ongoing transmissions refer to those transmissions (e.g., Hybrid Automatic Repeat Request transmissions) which were ongoing during receipt of a response to the request message from the receiving device 204. In other words, the action time is a time period after which the transmitting device 202 can start building and transmitting the MAC PDUs using the second negotiated maximum size (i.e., Q bytes). In one exemplary implementation, the action time is computed based on number of pending retransmissions and retransmission intervals. At step 910, the receiving device 204 sends a response message to the transmitting device 202, where the response message includes the action time. The response message may also include the second negotiated maximum size and the connection identifier associated with the active connection.

During the action time, the receiving device 204 determines whether MAC PDUs received from the transmitting device 202 contains multiple MAC SDUs using the first negotiated maximum size and the size of payload, at step 912. At step 914, the receiving device 204 decodes the one or more unfragmented MAC SDUs from the received MAC PDUs based on the determination.

Upon expiry of the action time, at step 916, the transmitting device 202 enables building of MAC PDUs containing one or more unfragmented MAC SDUs whose size is less than or equal to the second negotiated maximum size (e.g., Q bytes). At step 918, the transmitting device 202 transmits the MAC PDUs built using the second negotiated maximum size (e.g., Q bytes) to the receiving device 204. At step 920, the receiving device 204 determines whether MAC PDUs received from the transmitting device 202 contains multiple MAC SDUs using the second negotiated maximum size and the size of payload. At step 922, the receiving device 204 decodes the one or more unfragmented MAC SDUs from the received MAC PDUs based on the determination.

Figure 9B:
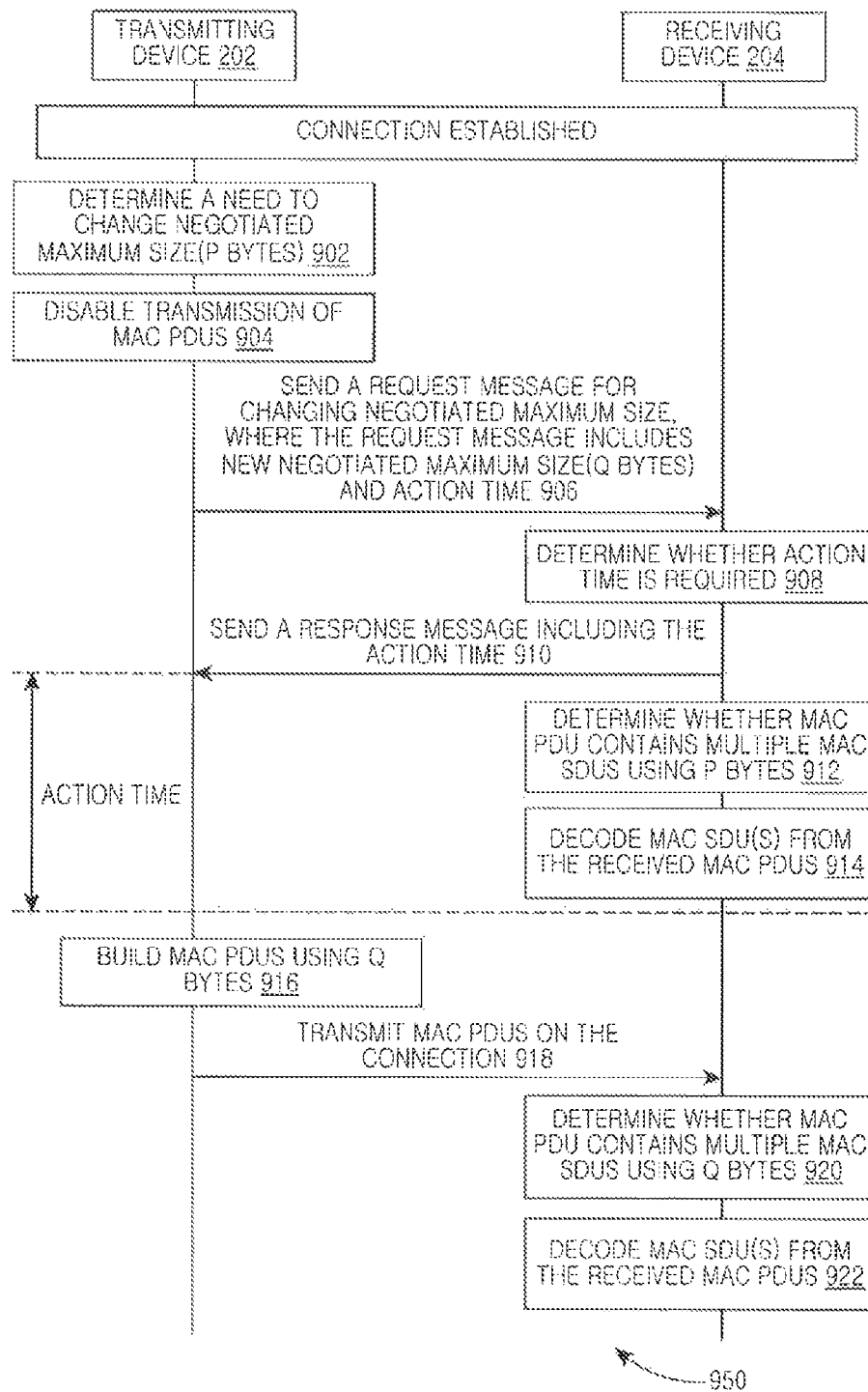

FIG. 9B is a process flowchart 950 illustrating an exemplary method of dynamically changing negotiated maximum size for a connection based on action time, according to one embodiment. The process flowchart 950 is similar to the process flowchart 900 illustrated in FIG. 9A, except steps 906 through 910.

In FIG. 9B, at step 906, the transmitting device 202 sends a request message for changing the negotiated maximum size to the receiving device 204, where the request message indicates the second negotiated maximum size (i.e., Q bytes) and action time for allowing completion of ongoing transmissions. In one embodiment, the transmitting device 202 computes the action time for allowing completion of ongoing transmissions. The request message may also include the connection identifier associated with the active connection. At step 908, the receiving device 204 determines that there are ongoing transmissions and a time period is required to complete the ongoing transmissions. At step 910, the receiving device 204 sends a response message to the transmitting device 202, where the response message includes the action time. The response message may also include the second negotiated maximum size and the connection identifier associated with the active connection.

Figure 9C:
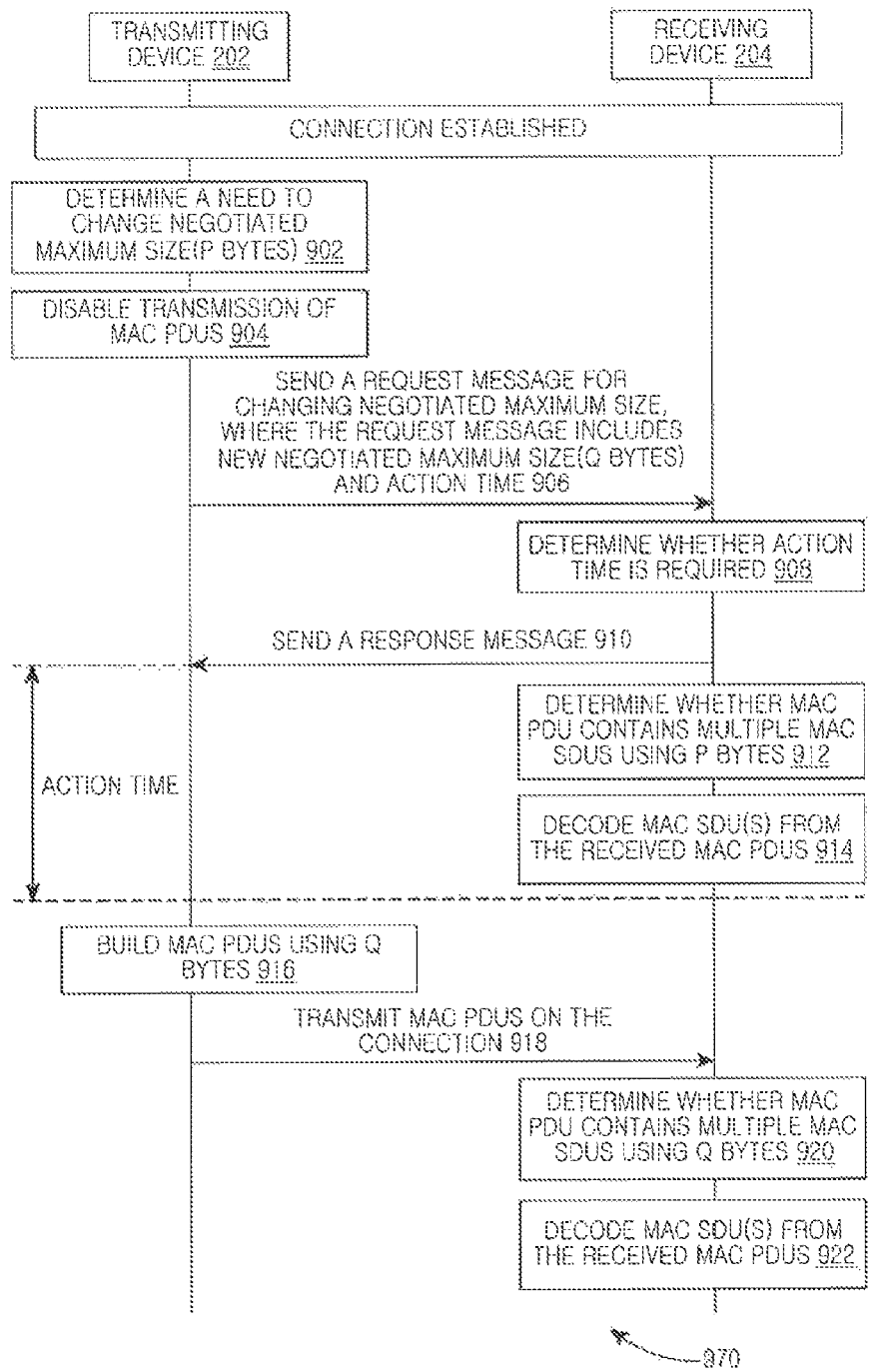

FIG. 9C is a process flowchart 970 illustrating an exemplary method of dynamically changing negotiated maximum size for a connection based on action time, according to one embodiment. The process flowchart 970 is similar to the process flowchart 900 illustrated in FIG. 9A, except steps 906 through 910.

In FIG. 9C, at step 906, the transmitting device 202 sends a request message for changing the negotiated maximum size to the receiving device 204, where the request message indicates the second negotiated maximum size (i.e., Q bytes) and action time for allowing completion of ongoing transmissions. In one embodiment, the transmitting device 202 computes the action time for allowing completion of ongoing transmissions. The request message may also include the connection identifier of the active connection. At step 908, the receiving device 204 determines that there are no ongoing transmissions and hence no action time is required. At step 910, the receiving device 204 sends a response message to the transmitting device 202, where the response message may include the second negotiated maximum size and the connection identifier associated with the active connection. It can be noted that, the transmitting device 202 stops building and transmitting MAC PDUs upon receiving the response message.

Figure 10A:
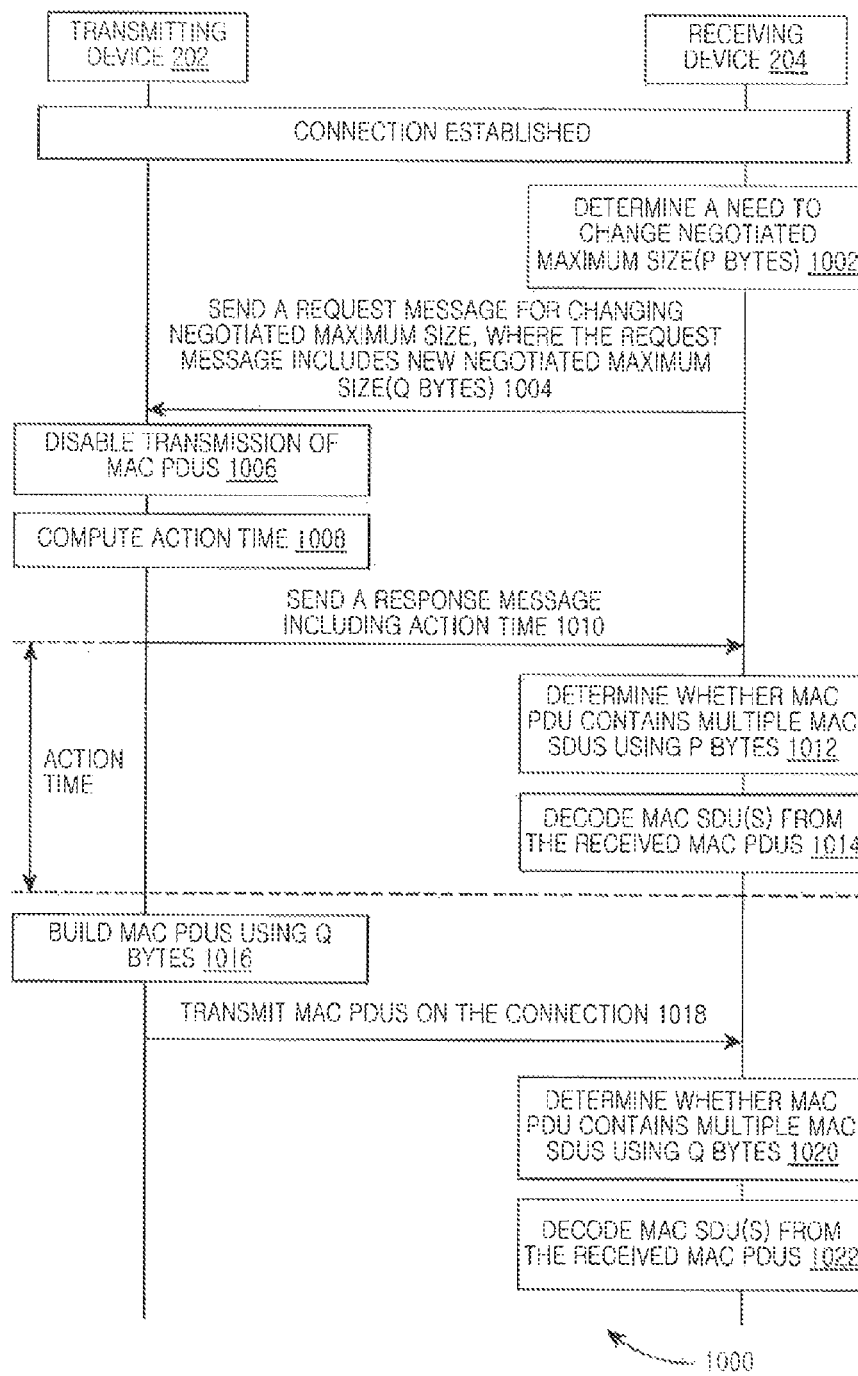
FIGS. 10A-C are process flowcharts illustrating an exemplary method of dynamically changing negotiated maximum size for a connection based on action time, according to another embodiment.

FIG. 10A is a process flowchart 1000 illustrating an exemplary method of dynamically changing negotiated maximum size for a connection based on action time, according to another embodiment. The process flow 1000 is similar to the process flow 900 illustrated in FIG. 9A, except that the receiving device 204 initiates change in negotiated maximum size. It can be noted that, in uplink, the transmitting device 202 is a mobile station and the receiving device is a base station. In downlink, the transmitting device 202 is a base station and the receiving device 204 is a mobile station.

While the connection is active, the receiving device 204 determines a need to change upper bound on size of unfragmented MAC SDUs from the first negotiated maximum size (P bytes) to a second negotiated maximum size (Q bytes), at step 1002. At step 1004, the transmitting device 202 sends a request message for changing the negotiated maximum size to the receiving device 204, where the request message indicates the second negotiated maximum size (i.e., Q bytes). The request message may also include the connection identifier associated with the active connection. At step 1006, the transmitting device 202 disables transmission of MAC PDUs containing unfragmented MAC SDUs on the connection. At step 1008, the transmitting device 202 computes an action time for allowing completion of ongoing transmissions. The ongoing transmissions refer to those transmissions (e.g., Hybrid Automatic Repeat Request transmissions) which were ongoing during receipt of the request message from the receiving device 204. In other words, the action time is a time period after which the transmitting device 202 can start building and transmitting the MAC PDUs using the second negotiated maximum size (i.e., Q bytes). At step 1010, the transmitting device 202 sends a response message to the receiving device 204, where the response message includes the action time. The response message may also include the connection identifier and the second negotiated maximum size.

It can be noted that, the transmitting device 202 stops building and transmitting MAC PDUs until expiry of the action time. During the action time, the receiving device 204 determines whether MAC PDUs received from the transmitting device 202 contains multiple MAC SDUs using the first negotiated maximum size and the size of payload, at step 1012. At step 1014, the receiving device 204 decodes the one or more unfragmented MAC SDUs from the received MAC PDUs based on the determination.

Upon expiry of the action time, at step 1016, the transmitting device 202 builds and transmits MAC PDUs containing one or more unfragmented MAC SDUs whose size is less than or equal to the second negotiated maximum size (e.g., Q bytes). At step 1018, the receiving device 204 determines whether MAC PDUs received from the transmitting device 202 contains multiple MAC SDUs using the second negotiated maximum size and the size of payload. At step 1020, the receiving device 204 decodes the one or more unfragmented MAC SDUs from the received MAC PDUs based on the determination.

Figure 10B:
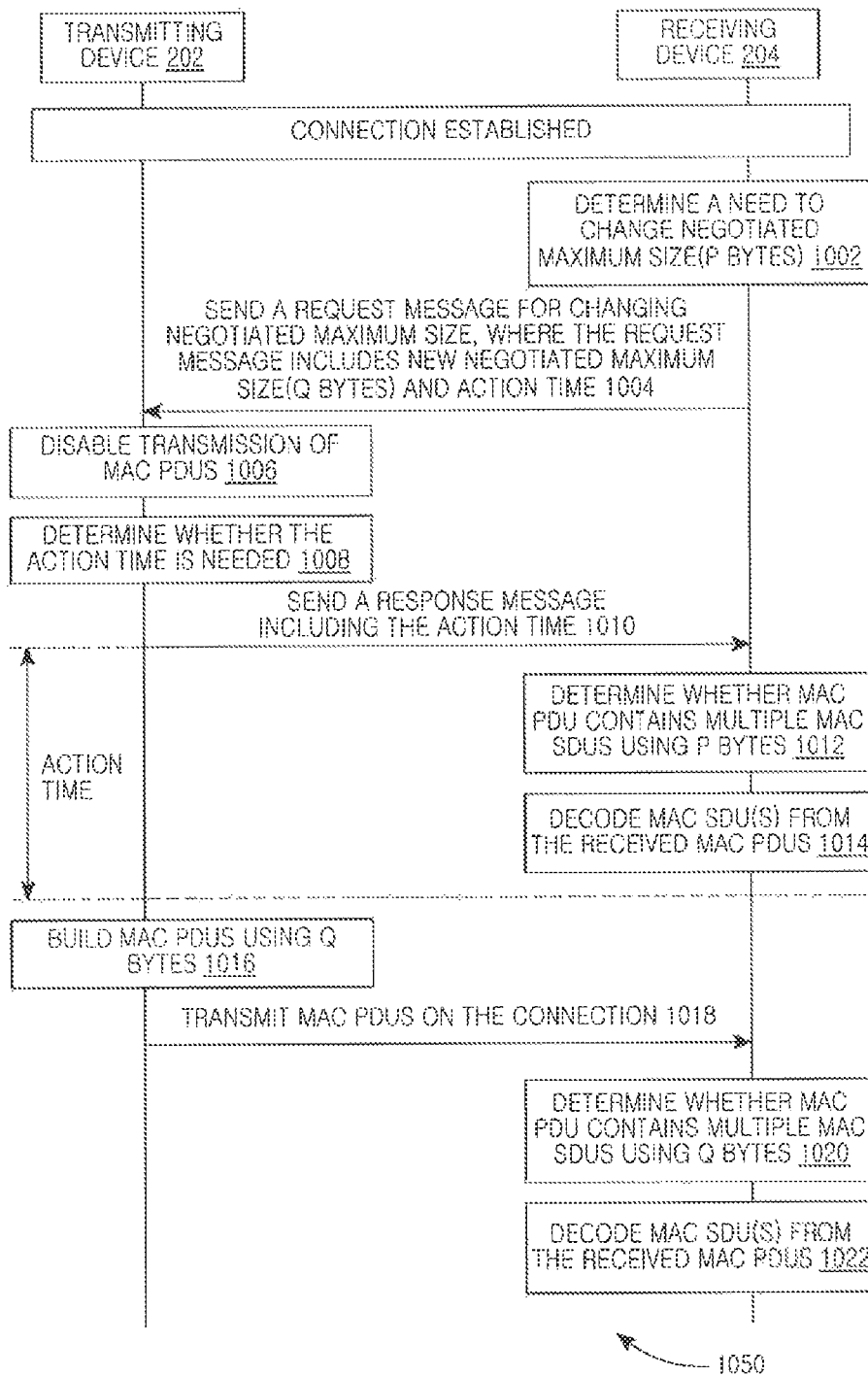

FIG. 10B is a process flowchart 1050 illustrating an exemplary method of dynamically changing negotiated maximum size for a connection based on action time, according to another embodiment. The process flowchart 1050 is similar to the process flowchart 1000 illustrated in FIG. 10A, except steps 1004 through 1010.

In FIG. 10B, at step 1004, the receiving device 204 sends a request message for changing the negotiated maximum size to the transmitting device 202, where the request message indicates the second negotiated maximum size (i.e., Q bytes) and action time for allowing completion of ongoing transmissions. In one embodiment, the receiving device 202 computes the action time for allowing completion of ongoing transmissions. The request message may also include the connection identifier of the active connection. At step 1006, the transmitting device 202 disables transmission of MAC PDUs containing unfragmented MAC SDUs on the connection. At step 1008, the transmitting device 202 determines that there are ongoing transmissions and a time period is required to complete the ongoing transmissions. At step 1010, the transmitting device 202 sends a response message to the receiving device 204, where the response message includes the action time. The response message may also include the connection identifier and the second negotiated maximum size.

Figure 10C:
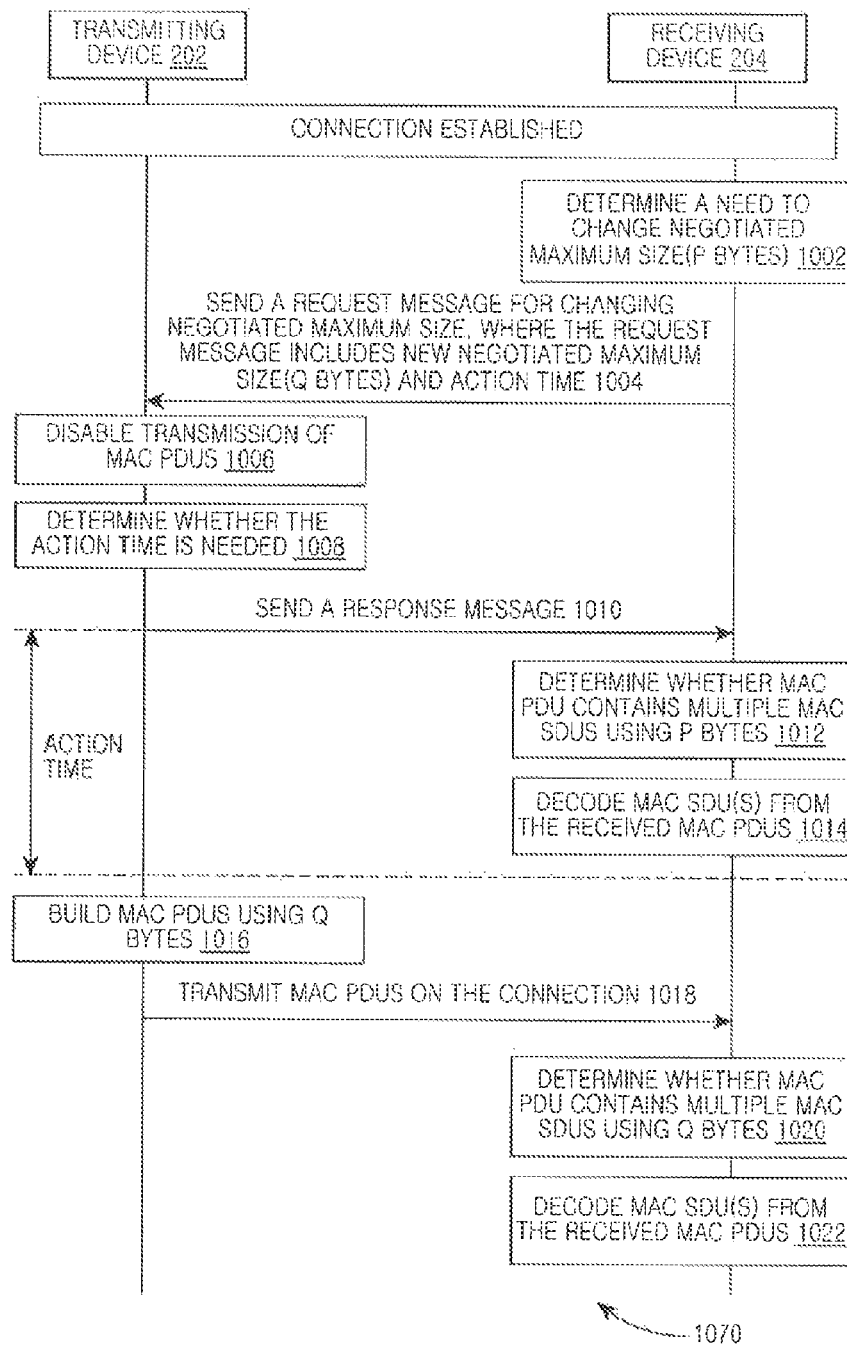

FIG. 10C is a process flowchart 1070 illustrating an exemplary method of dynamically changing negotiated maximum size for a connection based on action time, according to another embodiment. The process flowchart 1070 is similar to the process flowchart 1000 illustrated in FIG. 10A, except steps 1004 through 1010.

In FIG. 10C, at step 1004, the receiving device 204 sends a request message for changing the negotiated maximum size to the transmitting device 202, where the request message indicates the second negotiated maximum size (i.e., Q bytes) and action time for allowing completion of ongoing transmissions. In one embodiment, the receiving device 204 computes the action time for allowing completion of ongoing transmissions. The request message may also include the connection identifier associated with the active connection. At step 1006, the transmitting device 202 disables transmission of MAC PDUs containing unfragmented MAC SDUs on the connection. At step 1008, the transmitting device 202 determines that there are no ongoing transmissions and no action time is required. At step 1010, the transmitting device 202 sends a response message to the receiving device 204. The response message may include the second negotiated maximum size.

Figure 11A:
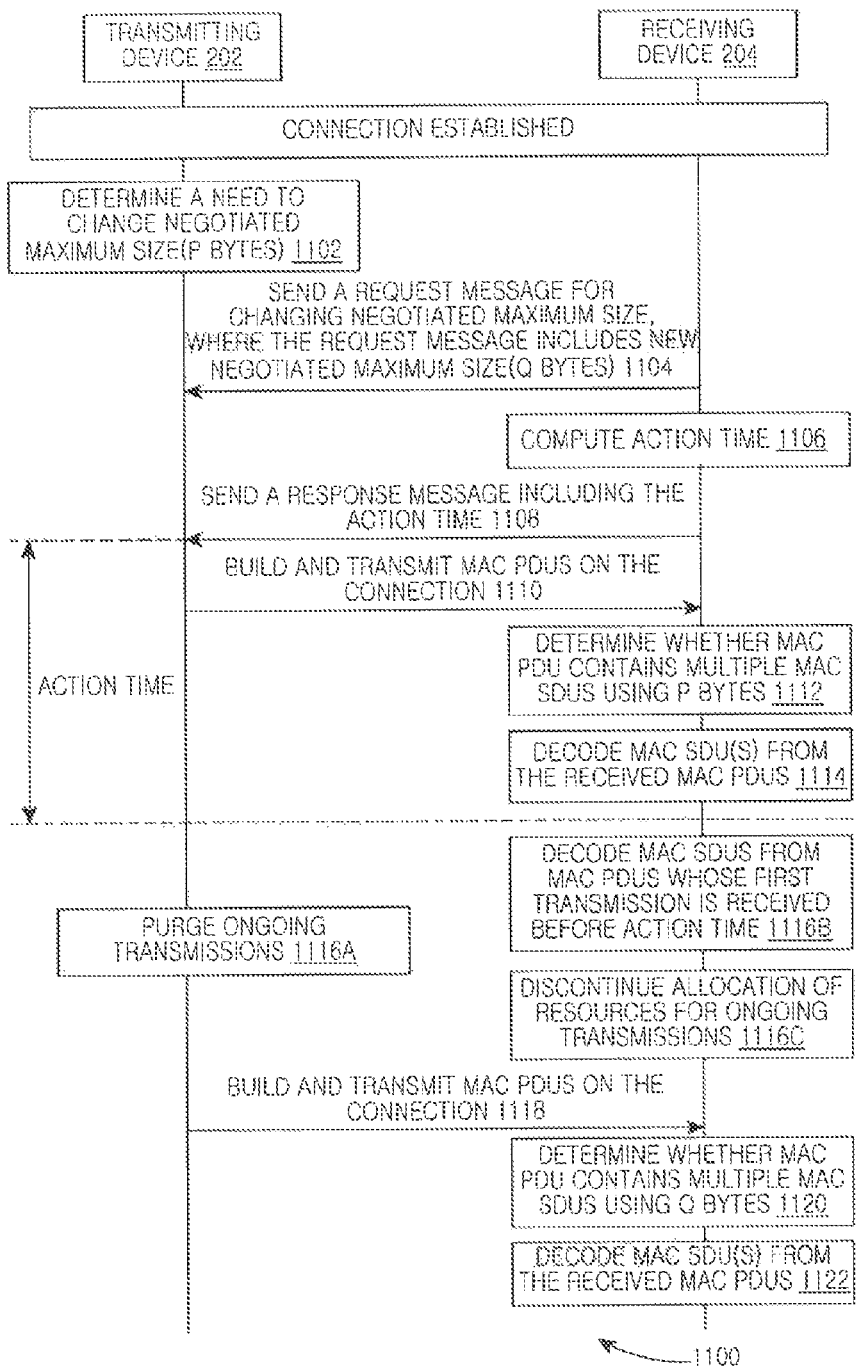
FIGS. 11A and 11B are process flowcharts illustrating another exemplary method of dynamically changing negotiated maximum size for a connection based on action time, according to one embodiment.

FIG. 11A is a process flowchart 1100 illustrating another exemplary method of dynamically changing negotiated maximum size for a connection based on action time, according to one embodiment. Consider that a connection is established between the transmitting device 202 and the receiving device 204. Also, consider that the transmitting device 202 builds MAC PDUs containing one or more unfragmented MAC SDUs using the negotiated maximum size of P bytes (herein after referred to as first negotiated maximum size) and transmits the MAC PDUs on the established connection. It can be noted that, in uplink, the transmitting device 202 is a mobile station and the receiving device is a base station. In downlink, the transmitting device 202 is a base station and the receiving device 204 is a mobile station.

While the connection is active, the transmitting device 202 determines a need to change upper bound on size of unfragmented MAC SDUs from the first negotiated maximum size (P bytes) to a second negotiated maximum size (Q bytes), at step 1102. At step 1104, the transmitting device 202 sends a request message for changing the negotiated maximum size to the receiving device 204, where the request message indicates the second negotiated maximum size (i.e., Q bytes). The request message may also include the connection identifier associated with the active connection. At step 1106, the receiving device 204 computes an action time for allowing completion of ongoing transmissions. The ongoing transmissions refer to those transmissions (e.g., Hybrid Automatic Repeat Request transmissions) which were ongoing during receipt of a response to the request message from the receiving device 204. In other words, the action time is a time period after which the transmitting device 202 can start building and transmitting the MAC PDUs using the second negotiated maximum size (i.e., Q bytes). At step 1108, the receiving device 204 sends a response message to the transmitting device 202. The response message may include the second negotiated maximum size and the action time.

At step 1110, the transmitting device 202 builds and transmits MAC PDUs using the first negotiated maximum size (i.e., P bytes) until expiry of the action time indicated in the response message. Before the action time, the receiving device 204 determines whether MAC PDUs received from the transmitting device 202 contains multiple MAC SDUs using the first negotiated maximum size and the size of payload, at step 1112. At step 1114, the receiving device 204 decodes the one or more unfragmented MAC SDUs from the received MAC PDUs based on the determination.

Upon expiry of the action time, at step 1116A, the transmitting device 202 purges any ongoing transmissions carrying the MAC PDUs which were built using the first negotiated maximum size. This step is applicable when the transmitting device 202 is a mobile station or the base station. Alternatively, at step 1116B, the receiving device 204 decodes MAC SDUs from the payload of MAC PDUs using the first negotiated maximum size if the first transmission associated with the MAC PDUs is which received before expiry of the action time. Alternatively, at step 1116C, the receiving device 204 discontinues allocation of resources for ongoing transmissions which were started before the expiry of action time. It is understood that, either of the steps 1116B and 1116C are applicable when the receiving device 204 is a base station and not applicable when the receiving device 204 is a mobile station.

At step 1118, the transmitting device 202 builds and transmits MAC PDUs containing one or more unfragmented MAC SDUs whose size is less than or equal to the second negotiated maximum size (e.g., Q bytes). At step 1120, the receiving device 204 determines whether MAC PDUs received from the transmitting device 202 contains multiple MAC SDUs using the second negotiated maximum size and the size of payload. At step 1122, the receiving device 204 decodes the one or more unfragmented MAC SDUs from the received MAC PDUs based on the determination.

Figure 11B:
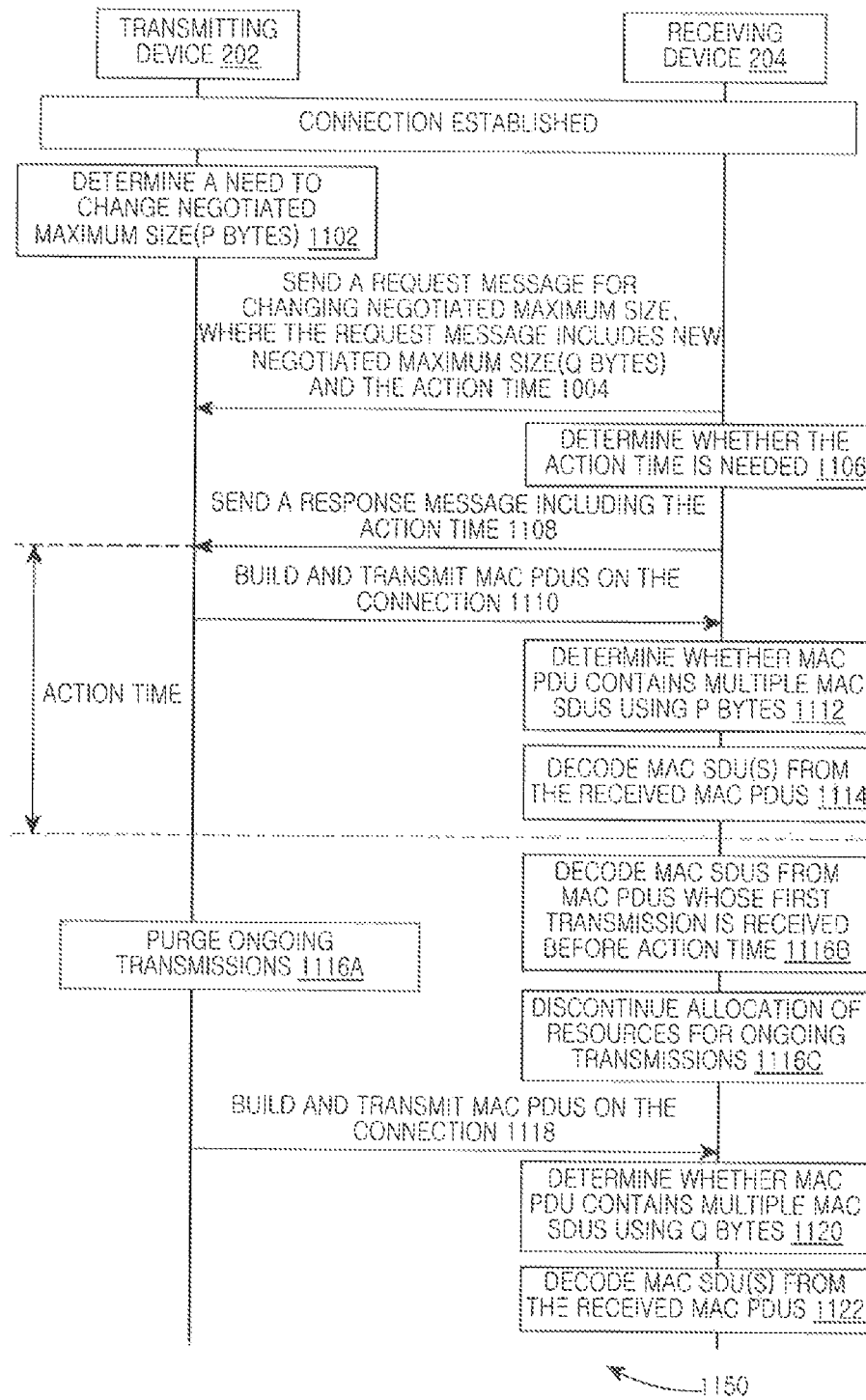

FIG. 11B is a process flowchart 1150 illustrating an exemplary method of dynamically changing negotiated maximum size for a connection based on action time, according to another embodiment. The process flowchart 1150 is similar to the process flowchart 1100 illustrated in FIG. 11A, except steps 1104 through 1108.

In FIG. 11B, at step 1104, the transmitting device 202 sends a request message for changing the negotiated maximum size to the receiving device 204, where the request message indicates the second negotiated maximum size (i.e., Q bytes) and action time for allowing completion of ongoing transmissions. In one embodiment, the transmitting device 202 computes the action time for allowing completion of ongoing transmissions. The request message may also include the connection identifier associated with the active connection. At step 1106, the receiving device 204 confirms that there are ongoing transmissions and the action time received in the request message is correct. At step 1108, the receiving device 204 sends a response message to the transmitting device 202. The response message may include the second negotiated maximum size and the connection identifier associated with the active connection.

Figure 12A:
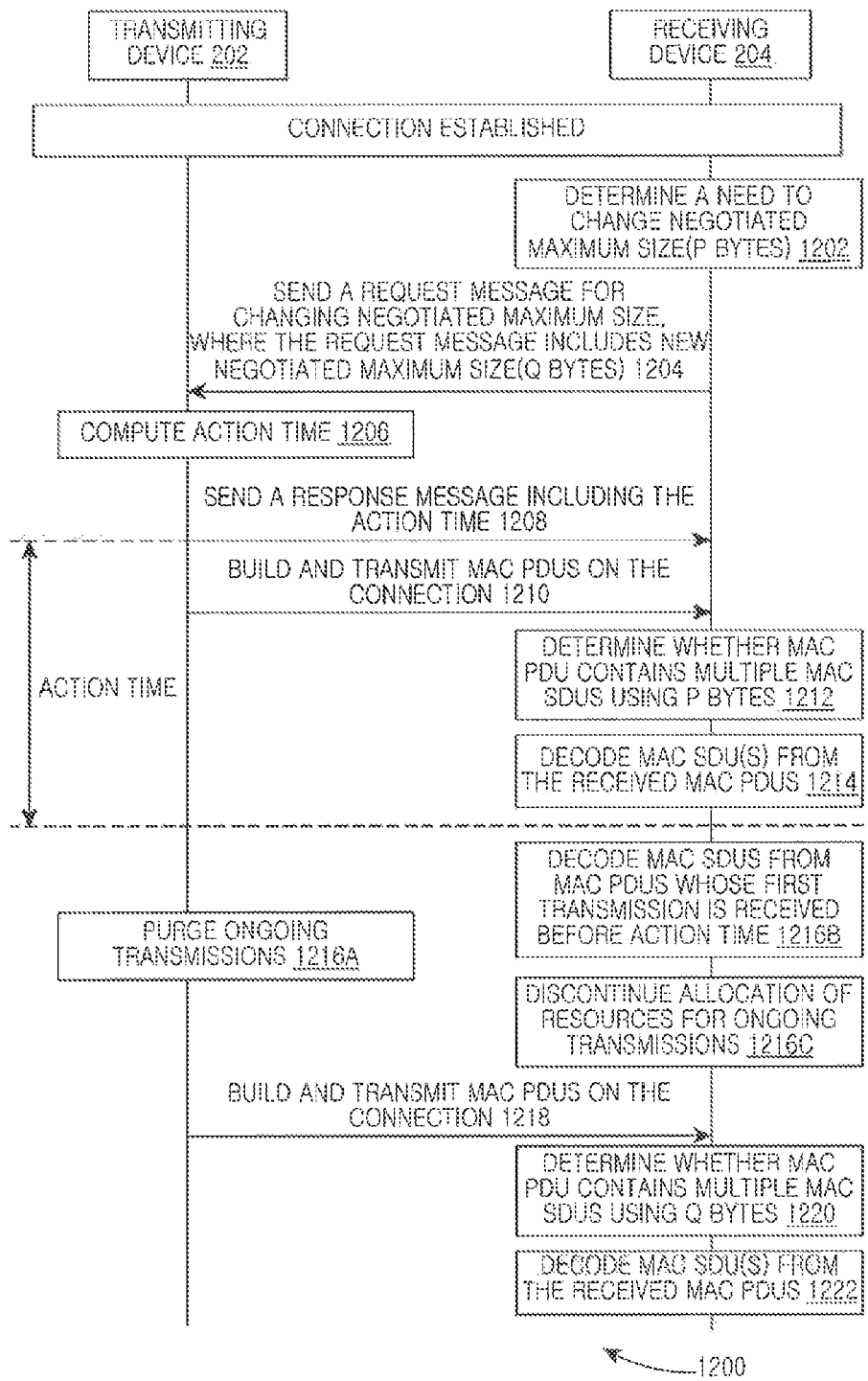
FIGS. 12A and 12B are process flowcharts illustrating another exemplary method of dynamically changing negotiated maximum size for a connection based on action time, according to another embodiment.

FIG. 12A is a process flowchart 1200 illustrating another exemplary method of dynamically changing negotiated maximum size for a connection based on action time, according to another embodiment. The process flow 1200 is similar to the process flow 1100 of FIG. 11A, except that the receiving device 204 initiates change in negotiated maximum size.

While the connection is active, the receiving device 204 determines a need to change upper bound on size of unfragmented MAC SDUs from the first negotiated maximum size (P bytes) to a second negotiated maximum size (Q bytes), at step 1202. At step 1204, the transmitting device 202 sends a request message for changing the negotiated maximum size to the receiving device 204, where the request message indicates the second negotiated maximum size (i.e., Q bytes). The response message may also include the connection identifier associated with the active connection. At step 1206, the transmitting device 202 computes an action time for allowing completion of ongoing transmissions. The ongoing transmissions refer to those transmissions (e.g., Hybrid Automatic Repeat Request transmissions) which were ongoing during receipt of the request message from the receiving device 204. In other words, the action time is a time period after which the transmitting device 202 can start building and transmitting the MAC PDUs using the second negotiated maximum size (i.e., Q bytes). At step 1208, the transmitting device 202 sends a response message to the receiving device 204. The response message may include the second negotiated maximum size and the action time.

At step 1210, the transmitting device 202 builds and transmits MAC PDUs using the first negotiated maximum size (i.e., P bytes) until expiry of the action time. During the action time, the receiving device 204 determines whether MAC PDUs received from the transmitting device 202 contains multiple MAC SDUs using the first negotiated maximum size and the size of payload, at step 1212. At step 1214, the receiving device 204 decodes the one or more unfragmented MAC SDUs from the received MAC PDUs based on the determination.

Upon expiry of the action time, at step 1216, the transmitting device 202 purges any ongoing transmissions carrying the MAC PDUs which were built using the first negotiated maximum size. This step is applicable when the transmitting device 202 is a mobile station or the base station. Alternatively, at step 1216B, the receiving device 204 decodes MAC SDUs from the payload of MAC PDUs using the first negotiated maximum size if the first transmission associated with the MAC PDUs is which received before expiry of the action time. Alternatively, at step 1216C, the receiving device 204 discontinues allocation of resources for ongoing transmissions which were started before the expiry of action time. It is understood that, either of the steps 1116B and 1116C are applicable when the receiving device 204 is a base station and not applicable when the receiving device 204 is a mobile station.

At step 1218, the transmitting device 202 builds and transmits MAC PDUs containing one or more unfragmented MAC SDUs whose size is less than or equal to the second negotiated maximum size (e.g., Q bytes). At step 1220, the receiving device 204 determines whether MAC PDUs received from the transmitting device 202 contains multiple MAC SDUs using the second negotiated maximum size and the size of payload. At step 1222, the receiving device 204 decodes the one or more unfragmented MAC SDUs from the received MAC PDUs based on the determination.

Figure 12B:
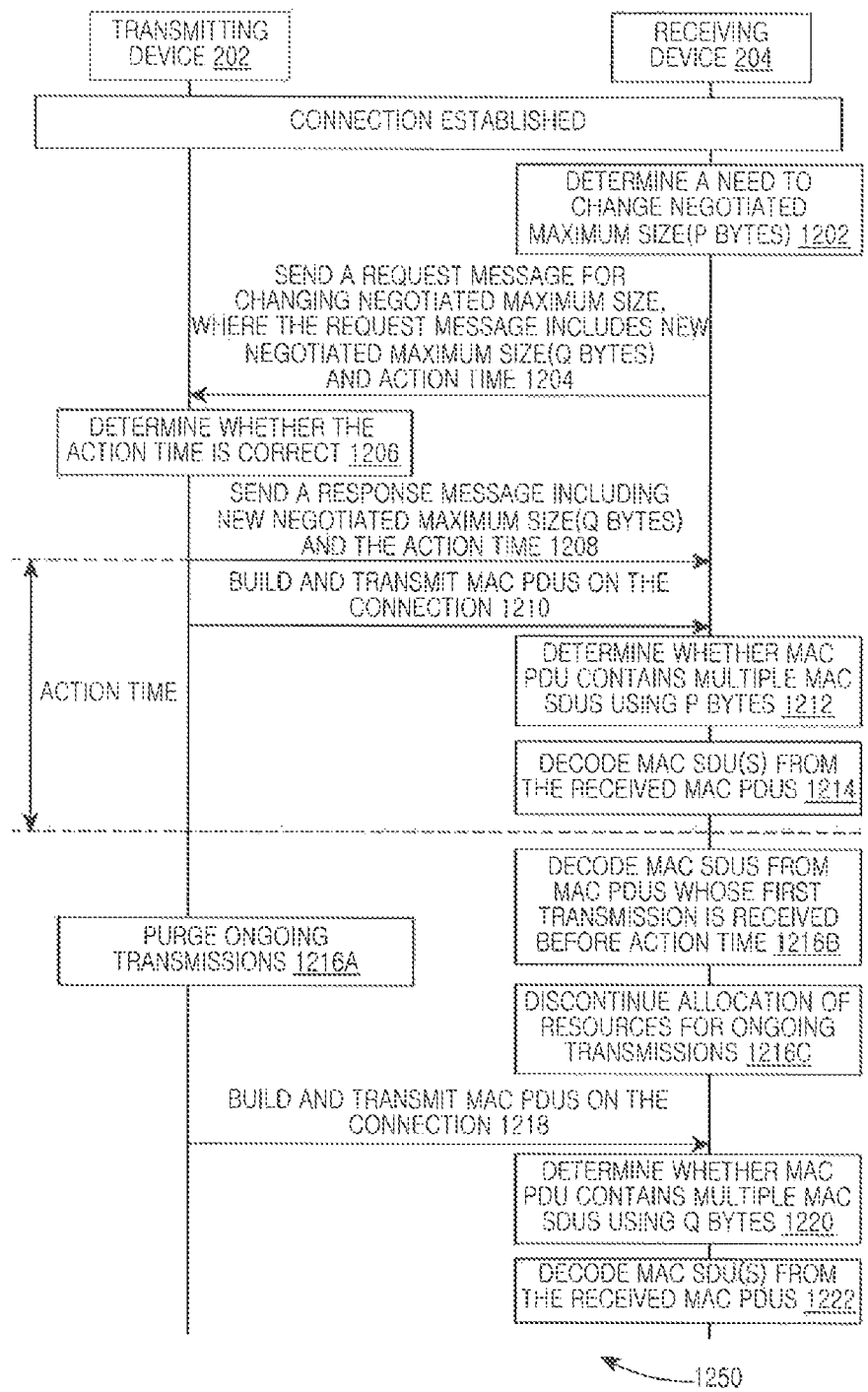

FIG. 12B is a process flowchart 1250 illustrating an exemplary method of dynamically changing negotiated maximum size for a connection based on action time, according to another embodiment. The process flowchart 1250 is similar to the process flowchart 1200 illustrated in FIG. 12A, except steps 1204 through 1208.

In FIG. 12BC, at step 1204, the receiving device 204 sends a request message for changing the negotiated maximum size to the transmitting device 202, where the request message indicates the second negotiated maximum size (i.e., Q bytes) and action time for allowing completion of ongoing transmissions. In one embodiment, the receiving device 204 computes the action time for allowing completion of ongoing transmissions. The request message may also include the connection identifier associated with the active connection. At step 1206, the transmitting device 202 confirms that there are ongoing transmissions and the action time received in the request message is correct. At step 1208, the transmitting device 202 sends a response message to the receiving device 204. The response message may include the second negotiated maximum size.

Figure 13:
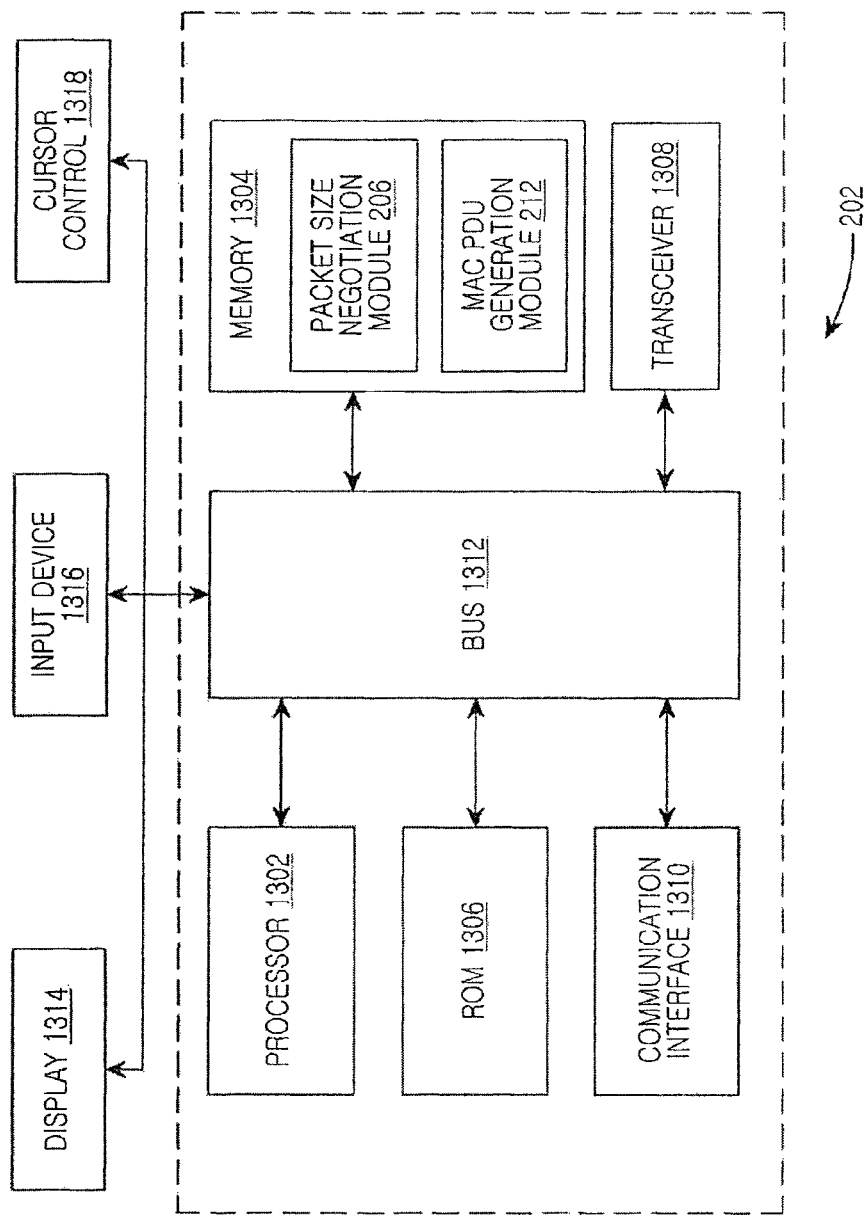
FIG. 13 is a block diagram of a transmitting device such as those shown in FIG. 1 depicting various components for implementing embodiments of the present subject matter.

FIG. 13 is a block diagram of the transmitting device 202 showing various components for implementing embodiments of the present subject matter. In FIG. 13, the transmitting device 202 includes a processor 1302, memory 1304, a read only memory (ROM) 1306, a transceiver 1308, a bus 1310, a communication interface 1312, a display 1314, an input device 1316, and a cursor control 1318.

The processor 1302, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1302 may also include embedded controllers, such as generic or programmable logic devices or arrays, application specific integrated circuits, single-chip computers, smart cards, and the like.

The memory 1304 and the ROM 1306 may be volatile memory and non-volatile memory. The memory 1304 includes the packet size negotiation module 206 for dynamically changing negotiated maximum size of MAC SDUs and the MAC PDU generation module 212 for generating MAC PDUs using the negotiated maximum size, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with modules, including functions, procedures, data structures, and application programs, for performing tasks, or defining abstract data types or low-level hardware contexts. The packet size negotiation module 206 and the MAC PDU generation module 212 may be stored in the form of machine-readable instructions on any of the above-mentioned storage media and may be executable by the processor 1302. For example, a computer program may include machine-readable instructions capable of dynamically changing negotiated maximum size and building MAC PDUs using the negotiated maximum size, according to the teachings and herein described embodiments of the present subject matter. In one embodiment, the program may be included on a compact disk-read only memory (CD-ROM) and loaded from the CD-ROM to a hard drive in the non-volatile memory.

The transceiver 1308 may be capable of transmitting and/or receiving one ore messages from the receiving device 204 for dynamically changing negotiated maximum size of MAC SDUs and transmitting the MAC PDUs. The bus 1310 acts as interconnect between various components of the transmitting device 202. The components such as the communication interface 1312, the display 1314, the input device 1316, and the cursor control 1318 are well known to the person skilled in the art and hence the explanation is thereof omitted.

Figure 14:
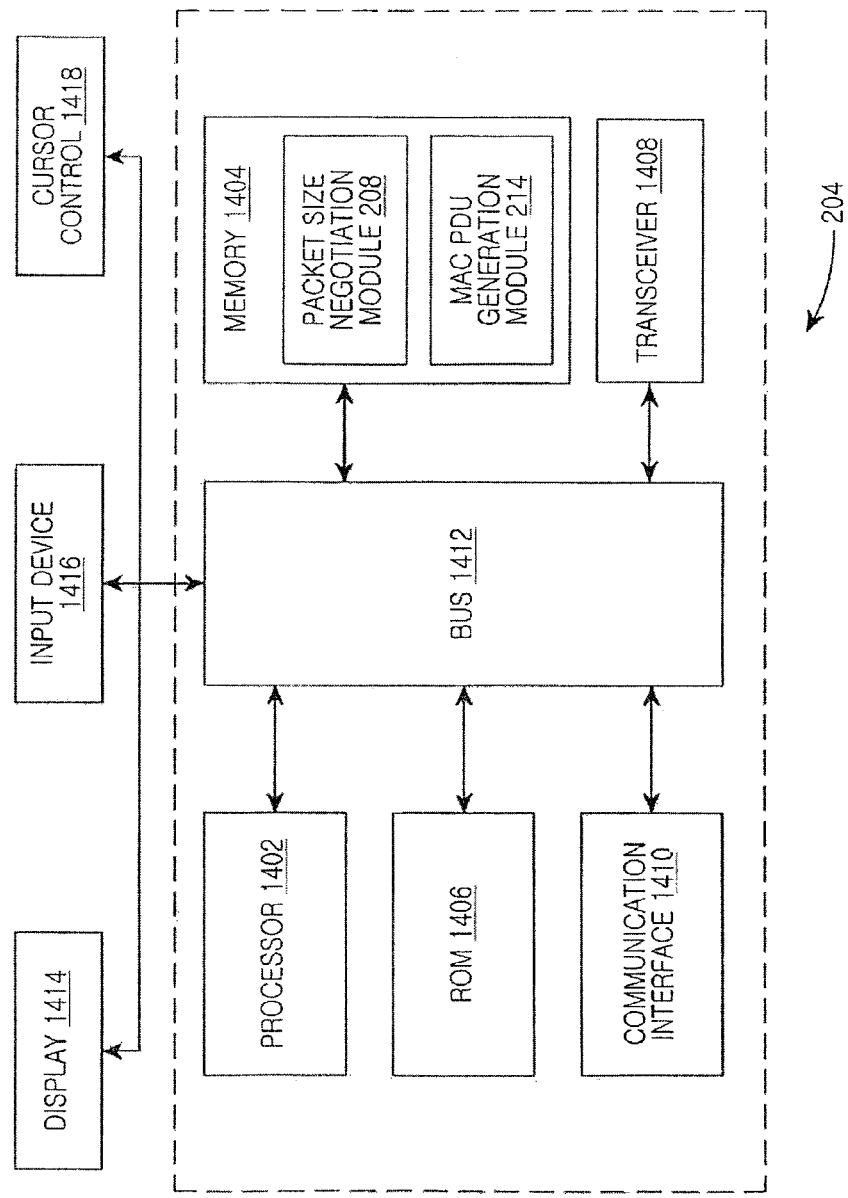
FIG. 14 is a block diagram of a receiving device such as those shown in FIG. 1 depicting various components for implementing embodiments of the present subject matter.

FIG. 14 is a block diagram of the receiving device 204 showing various components for implementing embodiments of the present subject matter. In FIG. 14, the receiving device 204 includes a processor 1402, memory 1404, a read only memory (ROM) 1406, a transceiver 1408, a bus 1410, a communication interface 1412, a display 1414, an input device 1416, and a cursor control 1418.

The processor 1402, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 1402 may also include embedded controllers, such as generic or programmable logic devices or arrays, application specific integrated circuits, single-chip computers, smart cards, and the like.

The memory 1404 and the ROM 1406 may be volatile memory and non-volatile memory. The memory 1404 includes the packet size negotiation module 208 for dynamically changing negotiated maximum size of MAC SDUs and the MAC PDU processing module 214 for decoding MAC SDUs from the MAC PDUs based on negotiated maximum size, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with modules, including functions, procedures, data structures, and application programs, for performing tasks, or defining abstract data types or low-level hardware contexts. The packet size negotiation module 206 and the MAC PDU processing module 214 may be stored in the form of machine-readable instructions on any of the above-mentioned storage media and may be executable by the processor 1402. For example, a computer program may include machine-readable instructions capable of dynamically changing negotiated maximum size of MAC SDUs and decoding MAC SDUs from MAC PDUs based on negotiated maximum size, according to the teachings and herein described embodiments of the present subject matter. In one embodiment, the program may be included on a compact disk-read only memory (CD-ROM) and loaded from the CD-ROM to a hard drive in the non-volatile memory.

The transceiver 1408 may be capable of transmitting and/or receiving one ore messages from the transmitting device 202 for dynamically changing negotiated maximum size of MAC SDUs and receiving MAC PDUs containing one or more MAC SDUs. The bus 1410 acts as interconnect between various components of the receiving device 204. The components such as the communication interface 1412, the display 1414, the input device 1416, and the cursor control 1418 are well known to the person skilled in the art and hence the explanation is thereof omitted.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method for operating a transmitting device, the method comprising:
    determining whether to change a first maximum size of at least one unfragmented medium access control (MAC) service data unit (SDU) included in a MAC protocol data unit (PDU);
    transmitting a request message for changing the first maximum size to a receiving device if the first maximum size of the at least one unfragmented MAC SDU is determined to be changed, the request message comprising a second maximum size;
    receiving, from the receiving device, a response message for the request message for changing the first maximum size to the second maximum size, the response message confirming the change from the first maximum size to the second maximum size; and
    in response to receiving the response message, transmitting, to the receiving device, at least one MAC PDU including at least one unfragmented MAC SDU generated based on the second maximum size.

2. The method of claim 1, further comprising:
    disabling transmission of at least one MAC PDU containing at least one unfragmented MAC SDU upon determining the need for change in the first maximum size.

3. The method of claim 1, further comprising:
    disabling packing of multiple unfragmented MAC SDUs in at least one MAC PDU upon determining the need for change in the first maximum size.

4. The method of claim 1, further comprising:
    identifying a sequence number of the last MAC PDU transmitted to the receiving device prior to transmission of the request message.

5. The method of claim 4, wherein the transmitting, to the receiving device, of the at least one MAC PDU including the at least one unfragmented MAC SDU generated based on the second maximum size comprises:
    generating at least one MAC PDU upon receiving the response message, each of the at least one MAC PDU containing at least one unfragmented MAC SDU generated based on the second maximum size, and the sequence number of the at least one MAC PDU being greater than a sequence number of the last MAC PDU transmitted prior to transmission of the request message; and
    transmitting the at least one MAC PDU to the receiving device.

6. The method of claim 4, further comprising:
    determining the total number of at least one MAC PDU carrying at least one unfragmented MAC SDU generated based on the first maximum size to be transmitted to the receiving device prior to transmission of at least one MAC PDU containing at least one unfragmented MAC SDU whose size is less than or equal to the second maximum size; and
    transmitting the total number of the at least one MAC PDU to the receiving device.

7. The method of claim 6, further comprising:
    generating at least one MAC PDU upon transmission of the total number of the at least one MAC PDU, each of the at least one MAC PDU containing at least one unfragmented MAC SDU generated based on the second maximum size, and a sequence number of the at least one MAC PDU being greater than the sequence number of the last MAC PDU transmitted prior to transmission of the at least one MAC PDU; and
    transmitting the at least one MAC PDU to the receiving device.

8. A method for operating a receiving device, the method comprising:
    determining whether to change a first maximum size of at least one unfragmented medium access control (MAC) service data unit (SDU) included in a MAC protocol data unit (PDU);
    transmitting a first request message for changing the first maximum size to a transmitting device if the first maximum size of the at least one unfragmented MAC SDU is determined to be changed, the first request message comprising a second maximum size;
    receiving a second request message from the transmitting device in response to the first request message, the second request message comprising the second maximum size;
    transmitting, to the transmitting device, a response message for the second request message confirming change from the first maximum size to the second maximum size in response to the second request message; and
    receiving, from the transmitting device, at least one MAC PDU including at least one unfragmented MAC SDU generated based on the second maximum size,
    wherein the at least one MAC PDU is transmitted in response to receiving the response message by the transmitting device.

9. The method of claim 8, wherein the transmitting of the first request message for changing the first maximum size to the transmitting device comprises:
    disabling transmission of at least one MAC PDU containing at least one unfragmented MAC SDU by the transmitting device upon receiving the first request message.

10. The method of claim 8, wherein the transmitting of the first request message for changing the first maximum size to the transmitting device comprises:
disabling packing of multiple unfragmented MAC SDUs in at least one MAC PDU generated based on the first maximum size by the transmitting device upon receiving the first request message.

11. The method of claim 8, wherein the receiving, from the transmitting device, of the at least one MAC PDU including the at least one unfragmented MAC SDU generated based on the second maximum size comprises:
receiving at least one MAC PDU which contains at least one unfragmented MAC SDU generated based on the second maximum size from the transmitting device, a sequence number of the at least one MAC PDU being greater than a sequence number of the last MAC PDU received prior to transmission of the first request message; and
decoding the at least one unfragmented MAC SDU from each of the at least one MAC PDU based on the second maximum size.

12. The method of claim 8, further comprising:
receiving at least one MAC PDU which contains at least one unfragmented MAC SDU generated based on the first maximum size from the transmitting device, a sequence number of the at least one MAC PDU being less than or equal to a sequence number of the last MAC PDU received prior to transmission of the first request message; and
decoding the at least one unfragmented MAC SDU from each of the at least one MAC PDU based on the first maximum size.

13. The method of claim 8, further comprising:
receiving at least one MAC PDU which contains at least one unfragmented MAC SDU generated based on the first maximum size from the transmitting device, a sequence number of the at least one MAC PDU being less than or equal to a sum of a sequence number of the last received MAC PDU and the total number of at least one MAC PDU received prior to reception of at least one MAC PDU generated based on the second maximum size; and
decoding the at least one unfragmented MAC SDU from each of the at least one MAC PDU based on the first maximum size.

14. The method of claim 8, wherein the receiving, from the transmitting device, of the at least one MAC PDU including the at least one unfragmented MAC SDU generated based on the second maximum size comprises:
receiving at least one MAC PDU which contains at least one unfragmented MAC SDU generated based on the second maximum size from the transmitting device, a sequence number of the at least one MAC PDU being greater than a sum of a sequence number of the last received MAC PDU and the total number of at least one MAC PDU received prior to reception of at least one MAC PDU generated based on the second maximum size; and
decoding the at least one unfragmented MAC SDU from each of the at least one MAC PDU based on the second maximum size.

15. A transmitting device comprising:
a transceiver;
at least one processor; and
memory coupled to the at least one processor,
wherein the at least one processor is configured to execute at least one instruction stored in the memory to change a maximum size of at least one unfragmented medium access control (MAC) service data unit (SDU) included in a MAC protocol data unit (PDU), by:
determining whether to change a first maximum size of the at least one unfragmented MAC SDU included in the MAC PDU,
sending a request message for changing the first maximum size to a receiving device if the first maximum size of the at least one unfragmented MAC SDU is determined to be changed, the request message comprising a second maximum size,
receiving, from the receiving device, a response message for the request message for changing the first maximum size to the second maximum size, the response message confirming the change from the first maximum size to the second maximum size, and
in response to receiving the response message, transmitting, to the receiving device, at least one MAC PDU including at least one unfragmented MAC SDU generated based on the second maximum size.

16. A receiving device comprising:
a transceiver;
at least one processor; and
memory coupled to the at least one processor,
wherein the at least one processor is configured to execute at least one instruction stored in the memory to change a maximum size of at least one unfragmented medium access control (MAC) service data unit (SDU) included in a MAC protocol data unit (PDU), by:
determining whether to change a first maximum size of the at least one unfragmented MAC SDU included in the MAC PDU,
transmitting a first request message for changing the first maximum size to a transmitting device if the first maximum size of the at least one unfragmented MAC SDU is determined to be changed, the first request message comprising a second maximum size,
receiving a second request message from the transmitting device in response to the first request message, the second request message comprising the second maximum size,
transmitting, to the transmitting device, a response message for the second request message confirming change from the first maximum size to the second maximum size in response to the second request message, and
receiving, from the transmitting device, at least one MAC PDU including at least one unfragmented MAC SDU generated based on the second maximum size, and
wherein the at least one MAC PDU is transmitted in response to receiving the response message by the transmitting device.

17. The transmitting device of claim 15, wherein the at least one processor is further configured to identify a sequence number of the last MAC PDU transmitted to the receiving device prior to transmission of the request message.

18. The transmitting device of claim 17,
wherein the at least one processor is further configured to:
form at least one MAC PDU upon receiving the response message, and
transmit the at least one MAC PDU to the receiving device, and
wherein each of the at least one MAC PDU contains at least one unfragmented MAC SDU generated based on the second maximum size and the sequence number of the at least one MAC PDU is greater than the sequence number of the last MAC PDU transmitted prior to transmission of the request message.

19. The receiving device of claim 16,
wherein the at least one processor is further configured to:
receive at least one MAC PDU which contains at least one unfragmented MAC SDU generated based on the second maximum size from the transmitting device, and
decode the at least one unfragmented MAC SDU from each of the at least one MAC PDU based on the second maximum size, and
wherein the sequence number of the at least one MAC PDU is greater than a sequence number of the last MAC PDU received prior to transmission of the first request message.

20. The receiving device of claim 16,
wherein the at least one processor is further configured to:
receive at least one MAC PDU which contains at least one unfragmented MAC SDU generated based on the second maximum size from the transmitting device, and
decode the at least one unfragmented MAC SDU from each of the at least one MAC PDU based on the second maximum size, and
wherein a sequence number of the at least one MAC PDU is greater than a sum of a sequence number of the last received MAC PDU and the total number of at least one MAC PDU received prior to reception of at least one MAC PDU generated based on the second maximum size.

21. The method of claim 1, wherein the request message further comprises at least one of connection identifier information and sequence number information.

22. The method of claim 8, wherein the second request message further comprises at least one of connection identifier information and sequence number information.

23. The transmitting device of claim 15, wherein the request message further comprises at least one of connection identifier information and sequence number information.

24. The receiving device of claim 16, wherein the second request message further comprises at least one of connection identifier information and sequence number information.

* * * * *